US012779674B2

(12) United States Patent
Wang et al.

(10) Patent No.: US 12,779,674 B2
(45) Date of Patent: Nov. 3, 2026

(54) ROBOTIC ARM CONTROL METHOD AND APPARATUS, DEVICECONTROLLER, AND STORAGE MEDIUM

(71) Applicant: TENCENT TECHNOLOGY (SHENZHEN) COMPANY LIMITED, Shenzhen (CN)

(72) Inventors: Shuai Wang, Shenzhen (CN); Zhaohui An, Shenzhen (CN); Wangwei Lee, Shenzhen (CN); Tianliang Liu, Shenzhen (CN); Xiao Teng, Shenzhen (CN); Yu Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 19/190,946

(22) Filed: Apr. 28, 2025

(65) Prior Publication Data

US 2026/0192444 A1 Jul. 9, 2026

Related U.S. Application Data

(63) Continuation of application No. PCT/CN2023/130283, filed on Nov. 7, 2023.

(30) Foreign Application Priority Data

Mar. 31, 2023 (CN) ......................... 202310365117.9

(51) Int. Cl.
*B25J 9/16* (2006.01)
*B25J 9/02* (2006.01)
*B25J 17/02* (2006.01)

(52) U.S. Cl.
CPC ............... *B25J 9/1628* (2013.01); *B25J 9/02* (2013.01); *B25J 9/1697* (2013.01); *B25J 17/0283* (2013.01)

(58) Field of Classification Search
None
See application file for complete search history.

(56) References Cited

U.S. PATENT DOCUMENTS 4,547,858 A 10/1985 Horak
2021/0197384 A1 7/2021 Lin et al.
(Continued)

FOREIGN PATENT DOCUMENTS

CN 205969048 U 2/2017
CN 210551219 U 5/2020
(Continued)

OTHER PUBLICATIONS

The World Intellectual Property Organization (WIPO) International Search Report for PCT/CN2023/130283 Feb. 1, 2024 5 Pages (including translation).

(Continued)

*Primary Examiner* — Adam R Mott
(74) *Attorney, Agent, or Firm* — ANOVA LAW GROUP, PLLC

(57) ABSTRACT

A robotic arm control method includes: obtaining a dynamic system constructed based on a robotic arm, and obtaining posture information associated with the robotic arm from the dynamic system; determining control information of the robotic arm based on a mapping relationship between the posture information and the control information; and controlling movement of the robotic arm according to the control information, to cause a movable object, that is placed on the robotic arm at any position other than an end of the robotic arm, to be in a balanced state on the robotic arm.

20 Claims, 11 Drawing Sheets

(56) References Cited

U.S. PATENT DOCUMENTS

| | | | | |
|---|---|---|---|---|
| 2022/0035373 A1* | 2/2022 | Inamoto | .................. | B25J 9/162 |
| 2023/0138728 A1* | 5/2023 | Alspach | ................. | B25J 13/084<br>73/862.581 |

FOREIGN PATENT DOCUMENTS

| | | | |
|---|---|---|---|
| CN | 111660286 | A | 9/2020 |
| CN | 211890879 | U | 11/2020 |
| CN | 113043267 | A | 6/2021 |
| CN | 213412000 | U | 6/2021 |
| CN | 218659074 | U | 3/2023 |
| CN | 116945154 | A | 10/2023 |

OTHER PUBLICATIONS

The European Patent Office (EPO) The Extended European Search Report for Application No. 23929934.0 Jul. 3, 2026 14 Pages.

Kwang-Kyu Lee et al., "Basketball robot: Ball-on-plate with pure haptic information." 2008 IEEE International Conference on Robotics and Automation. IEEE, 2008.

Cheng Zhou et al. "Optimal nonprehensile interception strategy for objects in flight." 2022 IEEE/RSJ International Conference on Intelligent Robots and Systems (IROS). IEEE, 2022.

Emaralla, S. R., Pasupuleti, S., & Ryu, J.-C. (2018). Throwing, catching, and balancing of a disk with a disk-shaped end effector on a two-link manipulator. ASME Journal of Mechanisms and Robotics, 10(5), 054501.

* cited by examiner (a)

(b)

(a)

(b)

ROBOTIC ARM CONTROL METHOD AND APPARATUS, DEVICECONTROLLER, AND STORAGE MEDIUM

CROSS-REFERENCES TO RELATED APPLICATIONS

This application is a continuation application of PCT Patent Application No. PCT/CN2023/130283, filed on Nov. 7, 2023, which claims priority to Chinese Patent Application No. 202310365117.9, filed on Mar. 31, 2023, all of which is incorporated by reference in their entirety.

FIELD OF THE TECHNOLOGY

Present disclosure relates to the field of robots and, in particular, to a robotic arm control method and controller, and a storage medium.

BACKGROUND OF THE DISCLOSURE

Nowadays, robots have gradually become irreplaceable tools in production, service and other fields. A robotic arm is a commonly used effector of a robot. An end of the robotic arm is usually used to implement an operation task. Alternatively, an end effector is installed at the end of the robotic arm to implement a corresponding operation. For example, a mechanical finger is mounted at the end of the robotic arm, and the operation is performed by controlling movement of the robotic arm and the mechanical finger.

SUMMARY

One aspect of present disclosure provides a robotic arm control method. The method includes: obtaining a dynamic system constructed based on a robotic arm, and obtaining posture information associated with the robotic arm from the dynamic system; determining control information of the robotic arm based on a mapping relationship between the posture information and the control information; and controlling movement of the robotic arm according to the control information, to cause a movable object, that is placed on the robotic arm at any position other than an end of the robotic arm, to be in a balanced state on the robotic arm.

Another aspect of present disclosure provides a controller. The controller includes one or more processors and a memory containing at least one program code that, when being executed, causes the one or more processors to perform: obtaining a dynamic system constructed based on a robotic arm, and obtaining posture information associated with the robotic arm from the dynamic system; determining control information of the robotic arm based on a mapping relationship between the posture information and the control information; and controlling movement of the robotic arm according to the control information, to cause a movable object, that is placed on the robotic arm at any position other than an end of the robotic arm, to be in a balanced state on the robotic arm.

Another aspect of present disclosure provides a non-transitory computer-readable storage medium containing a computer program that, when being executed, causes at least one processor to perform: obtaining a dynamic system constructed based on a robotic arm, and obtaining posture information associated with the robotic arm from the dynamic system; determining control information of the robotic arm based on a mapping relationship between the posture information and the control information; and controlling movement of the robotic arm according to the control information, to cause a movable object, that is placed on the robotic arm at any position other than an end of the robotic arm, to be in a balanced state on the robotic arm.

DESCRIPTION OF EMBODIMENTS

A robotic arm is a common robot effector. During the use of the robotic arm, an end of the robotic arm is usually used to complete an operation task; or an end effector is mounted at the end of the robotic arm to complete a corresponding operation, such as mounting a mechanical finger at the end of the robotic arm to complete the operation by controlling movement of the robotic arm and the mechanical finger.

Often, a rigid body connector and/or a shell of the robotic arm is not considered to be able to complete the operation task. First, an appearance of the robotic arm is generally designed as a curved surface without a large plane. Second, if there is no grasping mechanism design such as a mechanical finger or a robotic finger, contact between the appearance of the robotic arm and an external object does not form a shape closure and a force closure, which makes control of the robotic arm more difficult.

In some embodiments, the robotic arm is a robotic arm has a 7 degree of freedom. Control motors of an elbow and a wrist of the robotic arm are arranged at a hollow of a third joint of a shoulder. In some embodiments, rope actuation of the elbow and the wrist is transmitted to a pulley by a belt driven by the motor at the shoulder, and the pulley performs corresponding movement control of the elbow and the wrist by a belt transmission rope.

Figure 1:
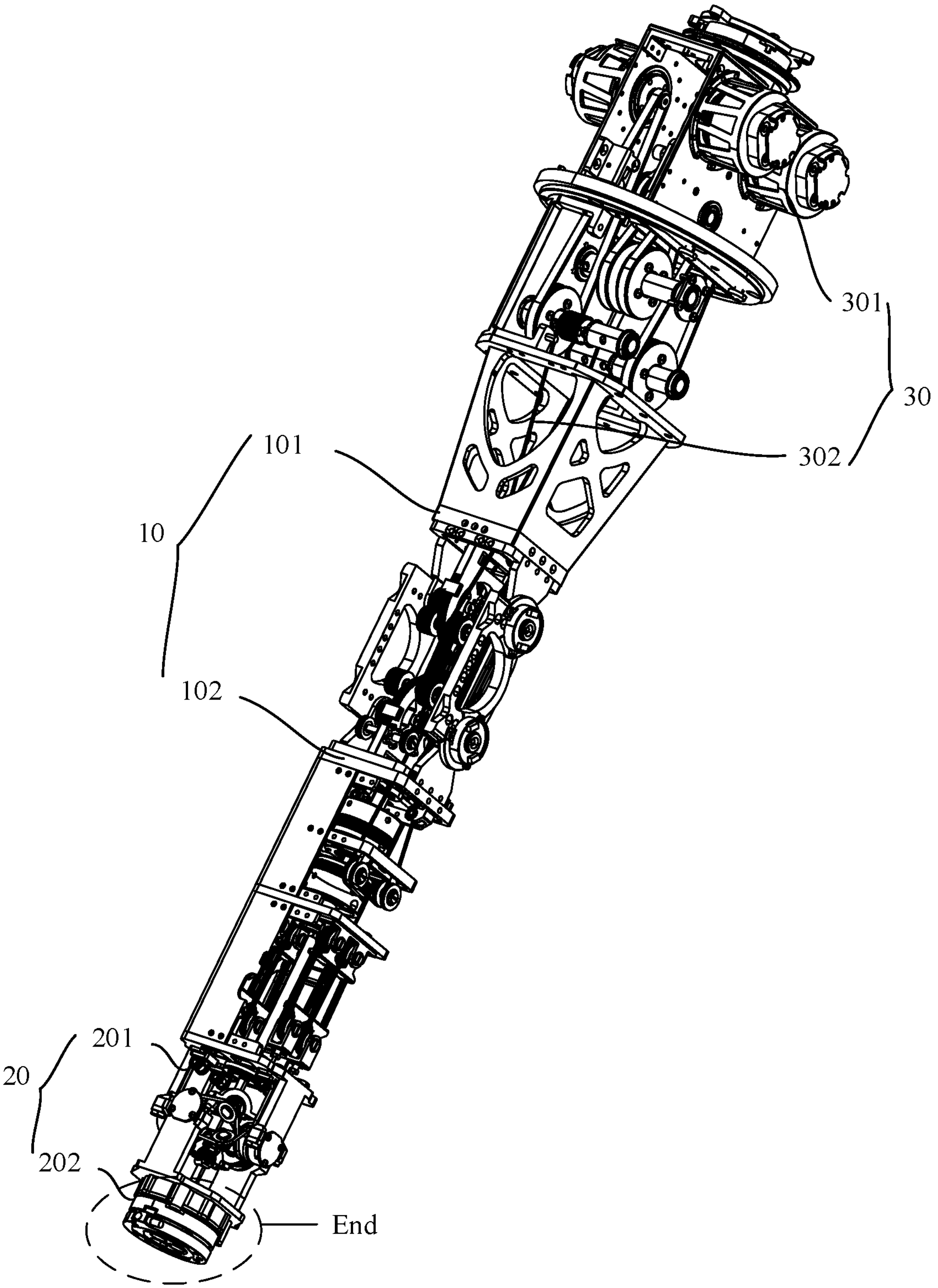
FIG. 1 is a schematic diagram of a robotic arm according to an exemplary embodiment of present disclosure.

FIG. 1 is a schematic diagram of a robotic arm according to an exemplary embodiment of present disclosure. For example, the robotic arm includes: a first robotic joint 10, a second robotic joint 20, and an actuation assembly 30. The first robotic joint 10 includes a first fixed member 101 and a first movable member 102 that are rotatably connected. The second robotic joint 20 includes a second fixed member 201 and a second movable member 202 that are rotatably connected. The second fixed member 201 is connected to the first movable member 102.

The actuation assembly 30 includes at least two actuation sources 301 and at least two actuation ropes 302. Each of the at least two actuation sources 301 is connected to the first fixed member 101, the first movable member 102, and the second movable member 202 by at least one actuation rope 302. The at least two actuation sources 301 include a first working mode and a second working mode.

In the first working mode, the at least two actuation sources 301 can actuate the second movable member 202 to rotate relative to the second fixed member 201, and cause the first movable member 102 to be fixed relative to a position of the first fixed member 101. In the second working mode, the at least two actuation sources 301 can actuate the second movable member 202, the second fixed member 201, and the first movable member 102 to rotate relative to the first fixed member 101, and cause the second movable member 202 to be fixed relative to a position of the second fixed member 201.

The robotic arm in present disclosure includes the first robotic joint 10, the second robotic joint 20, and the actuation assembly 30. The actuation assembly 30 includes at least two actuation sources 301 and at least two actuation ropes 302. Each of the at least two actuation sources 301 is connected to the first movable member 102 of the first robotic joint 10, the second movable member 202 of the second robotic joint 20, and the first fixed member 101 of the first robotic joint 10 through at least one actuation rope 302. In the first working mode, the at least two actuation sources 301 can actuate the second movable member 202 to rotate relative to the second fixed member 201, and cause the first movable member 102 to be fixed relative to the position of the first fixed member 101. In the second working mode, the at least two actuation sources 301 can actuate the second movable member 202, the second fixed member 201, and the first movable member 102 to rotate relative to the first fixed member 101, and cause the second movable member 202 to be fixed relative to the position of the second fixed member 201. In this way, the at least two actuation sources 301 can perform coupling actuation on a plurality of joints, utilization of the actuation source 301 is improved, structural complexity of robotic joints is reduced, rotational inertia of the robotic joints is increased, and movement performance of the robotic joints is enhanced.

In addition, in this embodiment, when the second robotic joint 20 independently moves (for example, the second movable member 202 rotates relative to the second fixed member 201, but the first movable member 102 is fixed relative to the first fixed member 101), and when the first robotic joint 10 drives the second robotic joint 20 to move in coupling (for example, the second movable member 202, the second fixed member 201, and the first movable member 102 rotate relative to the first fixed member 101, and the second movable member 202 is fixed relative to the position of the second fixed member 201), the at least two actuation sources 301 actuate at the same time. In other words, a joint corresponding to any degree of freedom moves actuated by power of the at least two actuation sources 301 regardless, and compared with a solution in which a joint corresponding to a single degree of freedom is actuated by a single actuation source 301, the at least two actuation sources 301 can perform coupling actuation on a single movable member, to achieve at least twice traction drive, which is conducive to improving working performance of the movable member such as a rotation moment and a rotation speed.

In some embodiments, the at least two actuation sources 301 include motors and driving rope pulleys. The motor is connected to the driving rope pulley through a transmission mechanism, and the motor drives, through the transmission mechanism, the driving rope pulley to rotate. The actuation rope 302 winds around the driving rope pulley. When the driving rope pulley rotates, the driving rope pulley can tightly wind the actuation rope 302 thereon, to produce a traction force on at least one of the first fixed member 101, the first movable member 102, and the second movable member 202 through the actuation rope 302. In some embodiments, the transmission mechanism includes, but is not limited to, a belt transmission mechanism, a gear transmission mechanism, a worm gear transmission mechanism, and the like.

For example, the transmission mechanism is the belt transmission mechanism, and includes, for example, a driving pulley, a transmission belt, and a passive pulley. The driving pulley is connected to an output shaft of a motor, the passive pulley is connected to the driving rope pulley, and the transmission belt is connected between the driving pulley and the passive pulley.

For another example, the transmission mechanism is the belt transmission mechanism, and further includes, for example, a tensioning mechanism. The tensioning mechanism is close to a transmission belt, and can be configured to adjust a tension force of the transmission belt.

In some implementation, the first working mode and the second working mode may be, for example, different working modes formed based on different or the same rotation direction of the at least two actuation sources 301; or may be different working modes formed based on different or the same rotation speed of the at least two actuation sources 301; or may be different working modes formed based on different or the same rotation direction or rotation speed of the at least two actuation sources 301. In some embodiments, in the first working mode, the at least two actuation sources 301 rotate in the same direction; and in the second working mode, the at least two actuation sources 301 rotate in opposite directions.

Therefore, in this embodiment, the robotic arm can control, by controlling the rotation direction of the at least two actuation sources 301, the second robotic joint 20 to independently move and the first robotic joint 10 to drive the second robotic joint 20 to move in coupling. In this way, a structure is simple, and coupling control efficiency is high. In some embodiments, in the first working mode, the at least two actuation sources 301 rotate in opposite directions; and in the second working mode, the at least two actuation sources 301 rotate in the same direction. In addition, for example, in the first working mode and in the second working mode, the rotation speeds and output torques of the at least two actuation sources 301 are the same.

With reference to FIG. 1, in some embodiments, the at least actuation sources 301 are located on a side of the first fixed member 101 facing away from the first movable member 102, and the at least two actuation ropes 302 pass through the first fixed member 101 to be connected to the first movable member 102, and pass through the second fixed member 201 to be connected to the second movable member 202. In this way, in the robotic arm in this embodiment, the at least two actuation sources 301 are arranged on the side of the first fixed member 101 facing away from the first movable member 102, and the actuation ropes 302 pass through the first fixed member 101 to be connected to the first movable member 102, and pass through the second fixed member 201 to be connected to the second movable member 202; mass of the at least two actuation sources 301 are aggregated on a side on which the first fixed member 101 is located, mass of a side on which the first movable member 102, and the second fixed member 201, and the second movable member 202 are located is small, which is conducive to improving rotational inertia of a structure of the side and improving operation performance of the robotic arm.

Figure 2:
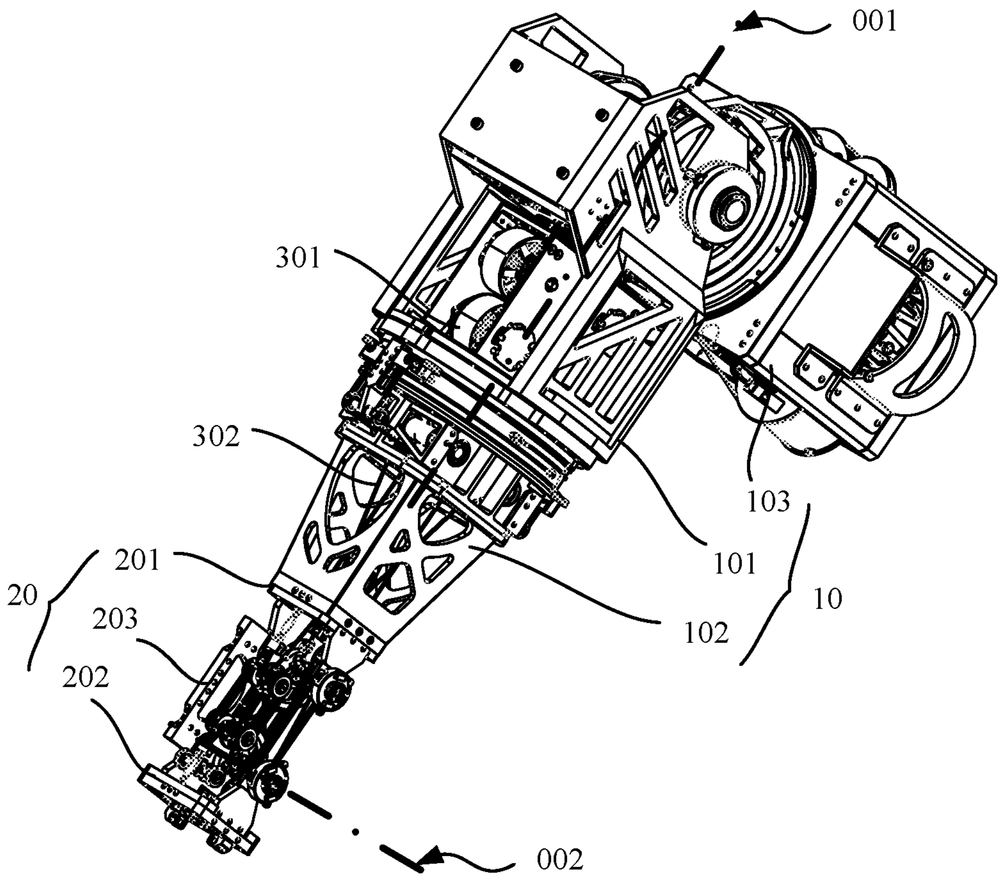
FIG. 2 is a schematic diagram of a robotic arm according to an exemplary embodiment of present disclosure.

With reference to FIG. 2, in some embodiments, the first robotic joint 10 is a robotic shoulder joint, and the second robotic joint 20 is a robotic elbow joint; the first fixed member 101 is rotatably connected to the first movable member 102 along a first axis 001; and the second fixed member 201 is rotatably connected to the second movable member 202 along a second axis 002.

In the first working mode, the at least two actuation sources 301 can actuate the second movable member 202 to rotate relative to the second fixed member 201 around the second axis 002, and cause the first movable member 102 to be fixed relative to the position of the first fixed member 101. In the second working mode, the at least two actuation sources 301 can actuate the second robotic joint 20 and the first movable member 102 to rotate relative to the first fixed member 101 around the first axis 001, and cause the second movable member 202 to be fixed relative to the position of the second fixed member 201.

In some other embodiments, the first robotic joint 10 is a robotic shoulder joint, and the second robotic joint 20 is a robotic elbow joint. In the first working mode, the at least two actuation sources 301 can actuate the second movable member 202 of the robotic elbow joint to rotate relative to the second fixed member 201 of the robotic elbow joint around the second axis 002, and the first movable member 102 of the robotic shoulder joint is fixed relative to the position of the first fixed member 101 of the robotic shoulder joint, to implement independent movement of the robotic elbow joint.

In the second working mode, the at least two actuation sources 301 can actuate the first movable member 102 of the robotic shoulder joint to drive the whole robotic elbow joint (including the second fixed member 201 and the second movable member 202) to rotate relative to the first fixed member 101 of the robotic shoulder joint around the first axis 001, but the second movable member 202 of the robotic elbow joint is fixed relative to the position of the second fixed member 201 of the robotic elbow joint, to implement coupling movement of the robotic elbow joint and the robotic shoulder joint.

For example, the robotic arm may use a set of actuation sources 301, and a controller may respectively actuate the robotic elbow joint and the robotic shoulder joint by controlling the set of actuation sources 301 to run in different working modes. Both degrees of freedom of the robotic elbow joint and the robotic shoulder joint can be driven through traction by the at least two actuation sources 301, to implement at least twice traction force drive, which is conducive to improving work performance such as a rotation moment and a rotation speed of the robotic elbow joint and the robotic shoulder joint.

In some embodiments, the robotic arm further includes a robotic wrist joint, the robotic shoulder joint is connected to the robotic elbow joint, and the robotic wrist joint is connected to the robotic elbow joint, to form a complete robotic arm. In some embodiments, the at least two actuation sources 301 are located in the second movable member 202, are connected to the second movable member 202, and move with the second movable member 202.

With reference to FIG. 2, in some embodiments, the first axis 001 and the second axis 002 intersect with each other perpendicularly. Therefore, the first robotic joint 10 (for example, the robotic shoulder joint) can drive the second robotic joint 20 (for example, the robotic elbow joint) to rotate, to simulate a motion of forearm rotation in an arm of a human body, and the second robotic joint 20 can rotate in a large range (for example, 0° to 360°) in space, so that action scenarios of the robotic arm are enriched, and an application range of the robotic arm is increased. With reference to FIG. 2, in some embodiments, the first robotic joint 10 further includes a third fixed member 103; and the first fixed member 101 is rotatably connected to the third fixed member 103. Therefore, the first robotic joint 10 includes the third fixed member 103, the first fixed member 101, and the first movable member 102 that are rotatably connected in sequence. In some embodiments, the first fixed member 101 is actuated to rotate relative to the second fixed member 201 by a shoulder actuation assembly, to simulate a lifting motion of a shoulder joint of an arm of a human body. The second fixed member 201 is fixedly connected to a torso or another support structure of a robot, and functions to fixedly support the entire robotic arm.

With reference to FIG. 2, in some embodiments, the second robotic joint 20 further includes a first connector 203, the second fixed member 201 is rotatably connected to the first connector 203, and the first connector 203 is in a rotatably connected to the second movable member 202. Therefore, in the robotic arm in this embodiment, the second fixed member 201 in the second robotic joint 20 is rotatably connected to the second movable member 202 through the first connector 203, so that the second axis 002 can be set at a position far from the second fixed member 201, and an angle by which the second movable member 202 can rotate relative to the second fixed member 201 is significantly expanded. In addition, in the robotic arm in present disclosure, difficulty in routing the actuation rope 302 of the robotic elbow joint is reduced, which is conducive to reducing difficulty in assembly and maintenance of the robotic elbow joint.

In the robotic arm in this embodiment, the at least two actuation sources 301 include two elbow driving rope pulleys, the two elbow driving rope pulleys are mounted in the first movable member 102, the two elbow driving rope pulleys can respectively actuate two elbow actuation ropes 302, and that the two elbow actuation ropes 302 wind around the two elbow driving rope pulleys implements connection between the actuation rope 302 and the first movable member 102.

The at least two actuation ropes 302 include the two elbow actuation ropes 302. The two elbow actuation ropes 302 are respectively connected to the first fixed member 101, the first movable member 102, and the second movable member 202, respectively connected to a first position and a second position of the second movable member 202, and finally connected to the second movable member 202 in opposite winding directions.

Figure 3:
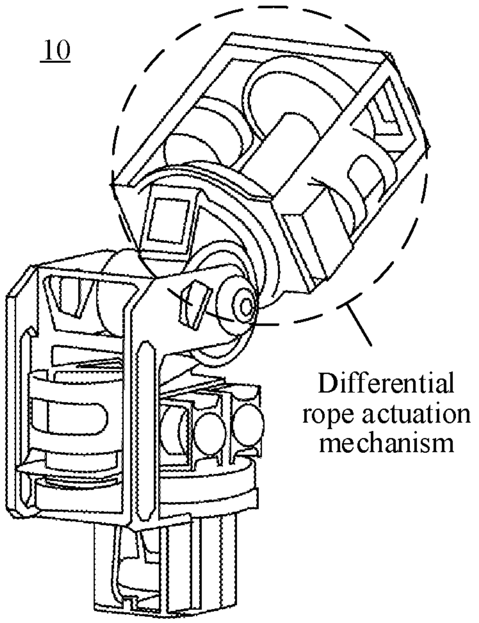
FIG. 3 is a schematic diagram of a robotic arm according to an exemplary embodiment of present disclosure.

Referring to FIG. 3, an example in which the first robotic joint 10 is the robotic shoulder joint is used. In a low-inertial differential shoulder joint structure of a robotic arm having 7 degrees of freedom, a differential rope actuation mechanism is used at the shoulder, which can reduce a weight of the mechanism and back a motor module, and may further implement moment superposition in some cases. The third degree of freedom of the shoulder joint is achieved by using a gear pair including a large cycloidal gear and a small cycloidal gear, which are driven by a rope for transmission, thereby further improving transmission precision and reducing the weight. Finally, actuation modules for the wrist joint and the elbow joint are placed in an upper arm module of the shoulder joint, thereby reducing the weight of the entire robotic arm.

Based on this, the structure of the robotic arm can be easily modularized, thereby simplifying the manufacturing process of the robotic arm.

Referring to the foregoing content, the end of the robotic arm is usually used to complete an operation task. An embodiment of present disclosure provides a robotic arm control method, to complete a balancing task by using a non-end part of a robotic arm. In this way, a movable object can remain balanced at any position on the robotic arm other than the end of the robotic arm.

As used herein, an "end of the robotic arm" is used for indicating an end of the robotic arm away from the shoulder joint. In some embodiments, the robotic arm is formed by a plurality of links connected head to tail. For example, a link 1 and a link 2 form a robotic arm, a first end of the link 1 is a shoulder joint, a second end of the link 1 is connected to a first end of the link 2, and an end is configured for indicating a second end of the link 2. In some embodiments, the end may alternatively be understood as a robotic apparatus connected to an end of the robotic arm away from the shoulder joint, such as a robotic hand providing a grabbing function, a magnetic sucker providing an attraction capability, or a bionic hand providing a bionic movement capability. For example, in a robotic arm is formed by a link 1 and a link 2, a first end of the link 2 is connected to the link 1, a second end of the link 2 is a robotic hand, and the end is configured for indicating the robotic hand on the link 2. Referring to FIG. 1, when the robotic arm is mounted on a robot body, the second movable member 202 is an end of the robotic arm away from the shoulder joint, that is, the end of the robotic arm described in the embodiments of present disclosure.

The movable object may be configured for indicating any three-dimensional object occupying specific space, and a shape, a size, a material, mass, and the like of the object are not limited. Further, at least one outer surface of the movable object is a curved surface, or at least one edge on the outer surface of the movable object is a curve. In an implementation, the movable object can roll and/or slide on the robotic arm under action of gravity. For example, the movable object may be a bottle, a rod piece, a sphere, or an irregular object. Further, a cross section of the movable object is a circle, an ellipse, or a closed shape formed by a curve. The movable object is a non-fixed object, and the movable object is not fixed to the robotic arm. For example, the movable object and the robotic arm are not fixed through any one of a fastener, a tenon joint structure, soldering, or the like. The movable object may be placed at any position on the robotic arm other than the end, and is not fixed to the robotic arm. Further, the movable object is placed at any position other than the end of the robotic arm. A part of the outer surface of the movable object is in contact with the robotic arm, and other parts of the outer surface are not in contact with the robotic arm.

Using an example in which the movable object is a bottle, for a robotic arm having a plurality of degrees of freedom, in the robotic arm control method provided in the embodiments of present disclosure, by using a non-end link (for example, a lower arm of the robotic arm) of the robotic arm, the bottle is balanced on a surface of the lower arm of the robotic arm without falling. The control method provided in the embodiments of present disclosure may be implemented by the foregoing controller of the robotic arm. The controller may be arranged in the robotic arm, or may be arranged outside the robotic arm and connected to the robotic arm in a wired or wireless manner, to control movement of the robotic arm.

Figure 4:
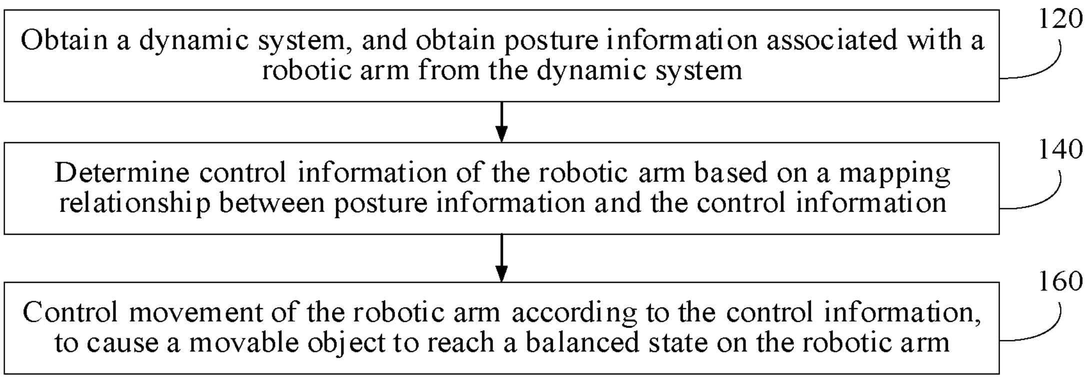
FIG. 4 is a flowchart of a robotic arm control method according to an exemplary embodiment of present disclosure.
Figure 5:
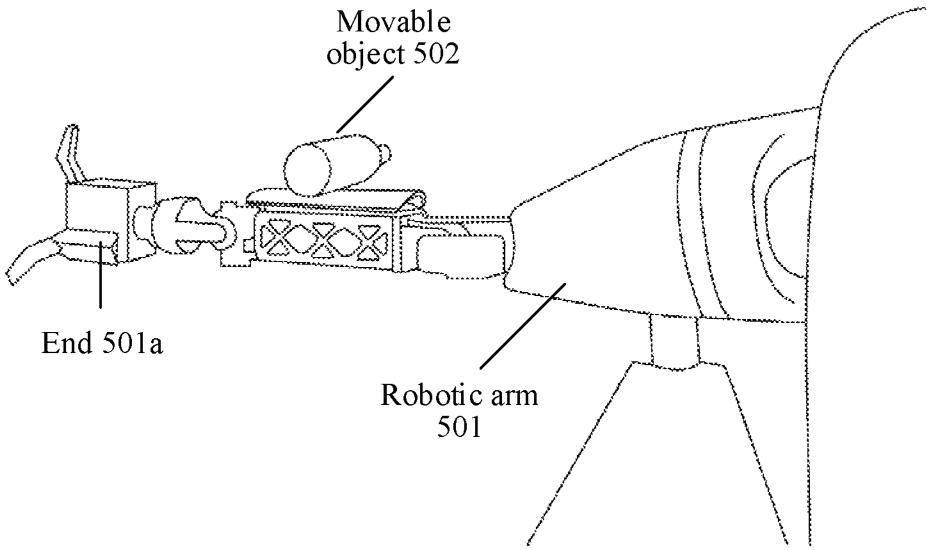
FIG. 5 is a schematic diagram of balancing of a robotic arm according to an exemplary embodiment of present disclosure.

FIG. 4 is a flowchart of a robotic arm control method according to an exemplary embodiment of present disclosure. FIG. 5 is a schematic diagram of balancing of a robotic arm according to an exemplary embodiment of present disclosure. A movable object 502 may be placed at any position on a robotic arm 501 other than an end 501*a*. For introduction of the movable object 502, refer to the foregoing content. Referring to FIG. 5, an example in which the movable object is a bottle is used, and the bottle is placed on a lower arm of the robotic arm. For example, the robotic arm control method provided in the embodiments of present disclosure includes:

Operation 120: Obtain a dynamic system, and obtain posture information associated with a robotic arm from the dynamic system.

For example, the dynamic system is constructed based on at least the robotic arm. The dynamic system is configured for describing a force and/or movement relationship of the robotic arm when the movable object is in a balanced state. Because control of the robotic arm (or may be understood as a dynamic response in which the robotic arm balances the movable object) is double-restricted by movement of the robotic arm and movement of the movable object, the dynamic system needs to reflect an interaction relationship between the robotic arm and the movable object.

In some embodiments, a coordinate system may be constructed based on the robotic arm, and moment information and/or motion information, such as a control moment of each joint of the robotic arm and/or a displacement amount of each rod component relative to an initial position, of the robotic arm may be obtained through at least one sensor associated with the robotic arm. The at least one sensor includes, but is not limited to, one of the following sensors: a moment sensor, a tactile sensor, a visual sensor, and the like. Related information of the movable object, such as a position of the movable object relative to the robotic arm, may further be obtained through the at least one sensor. Subsequently, a dynamic system may be constructed based on the constructed coordinate system and the obtained moment information and/or motion information.

The dynamic system may be constructed based on the robotic arm, or may be constructed based on the robotic arm and the movable object.

Figure 6:
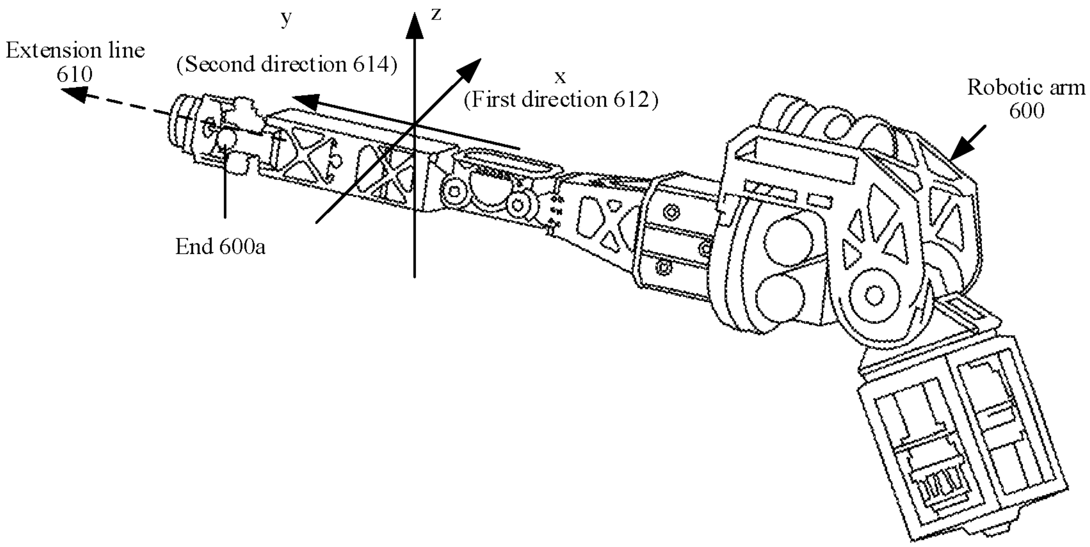
FIG. 6 is a schematic diagram of balancing of a robotic arm according to an exemplary embodiment of present disclosure.

In some embodiments, as shown in FIG. 6, the dynamic system is constructed based on the robotic arm.

When the robotic arm fully extends, a line connects two ends of the robotic arm, a direction of a straight line perpendicular to the connection line between the two ends when the robotic arm extends is an x direction, a direction of the connection line between the two ends when the robotic arm extends is a y direction, and a direction of a perpendicular line perpendicular to the robotic arm when the robotic arm extends is a z direction. For example, the x direction is a first direction 612 in the embodiments of present disclosure, and the y direction is a second direction 614 in the embodiments of present disclosure.

Based on this, the straight line perpendicular to the connection line between the two ends of the robotic arm when the robotic arm extends is an x-axis (which may also be referred to as a first rotation axis), and the x-axis is located at an end of the robotic arm close to the shoulder joint. When the robotic arm extends, an extension line of the connection line between the two ends is a y-axis (which may also be referred to as a second rotation axis), and the y-axis passes through a center of the robotic arm. For example, the robotic arm may rotate around the x-axis and/or the y-axis, an angle by which the robotic arm rotates around the x-axis may be considered as a roll angle, and an angle by which the robotic arm rotates around the y-axis may be considered as a pitch angle. The extension line of the robotic arm is an extension direction of the robotic arm when the robotic arm extends straight. For example, a vertical direction and the direction of the earth gravity are on a same straight line, and a horizontal plane is a plane in which a horizontal direction perpendicular to the earth gravity is located. For example, FIG. 6 shows an extension line 610 when the robotic arm extends straight. For example, the extension line 610 is a ray pointing out of the robotic arm from an end 600*a* of the robotic arm 600. A direction of the extension line 610 is parallel to a direction starting from a center of mass of the lower arm of the robotic arm 610 and pointing to the end 600*a* of the robotic arm. For example, in FIG. 6, the extension line 610 and the y-axis are parallel. For example, the extension line 610 in FIG. 6 starts from the lower arm of the robotic arm 600. For example, the extension line 610 may start from any position on the robotic arm 600. In another implementation, a direction of the extension line 610 may be indicated by a ray starting at a position other than the robotic arm 600. This is not limited according to various embodiments of the present disclosure.

In some other embodiments, the dynamic system may be constructed based on the robotic arm and the movable object. Referring to FIG. 5 and FIG. 6, when the movable object is placed at any position other than the end of the robotic arm, the movable object needs to be displayed in the x direction. An example in which the movable object is a bottle, and the bottle is considered as a cylinder. In this case, a direction in which a length of the cylinder locates is an x direction, and a plane in which a ground of the cylinder locates is a plane formed by a y axis and a z axis.

For example, after the dynamic system is constructed, posture information of the dynamic system may be obtained. The posture information is configured for indicating information obtained based on the dynamic system and at least associated with the robotic arm. According to the foregoing content, the dynamic system is configured for describing the force and/or motion relationship of the robotic arm when the robotic arm keeps the movable object in balance, and correspondingly, the posture information is configured for describing a posture of the robotic arm when the robotic arm keeps the movable object in balance. In some embodiments, the posture information includes at least one piece of the following information: the moment information of the robotic arm, the motion information of the robotic arm, and motion information of the movable object. For example, the posture information includes one piece of the following information: rotation angles of the robotic arm in different two-dimensional planes (which may be understood as the motion information of the robotic arm), included angles between the robotic arm and the horizontal plane (which may be understood as the motion information of the robotic arm), and linear distances in the x direction between a center of the movable object and a center of a joint that controls the robotic arm to rotate (which may be understood as the motion information of the movable object). In some embodiments, the posture information may be obtained through the visual sensor. For example, a camera is disposed on the robotic arm or in an external environment, to obtain image information of the robotic arm and the movable object. The image information is configured for showing that the movable object is placed on the robotic arm. Subsequently, the image information is processed to obtain an image processing result. For example, after the image information is obtained, cluster analysis is performed based on at least one of information such as a color, a material, a surface texture, and a connected area of the movable object and an object in the environment, to determine a geometric center of the movable object, and a position of the geometric center and a position of a center of mass in the dynamic system can be determined subsequently. Based on this, with reference to the related information of the robotic arm, the posture information can be obtained. In some other embodiments, the posture information may alternatively be obtained through the visual sensor and the tactile sensor. For example, the tactile sensor is laid on a housing of the robotic arm, to collect a corresponding tactile signal when the movable object is placed on the robotic arm. Based on this, a specific position of the movable object on the robotic arm can be obtained accurately, and with reference to the related information of the robotic arm, the posture information can be obtained.

Operation 140: Determine control information based on a mapping relationship between the posture information and the control information of the robotic arm.

Referring to FIG. 5, the movable object is placed at any position on the robotic arm other than the end. An objective of the robotic arm control method provided in the embodiments of present disclosure is to ensure that the movable object is in a balanced state on the robotic arm. Based on this, the controller needs to evaluate a state at a next moment based on a current state of the dynamic system, and determine, based on the state at the next moment, control information of the robotic arm at the next moment, so that the movable object can always remain balanced on the robotic arm without falling.

The control information may be determined based on a mapping relationship between the posture information and the control information. Referring to the foregoing content, the dynamic system is constructed based on the robotic arm and/or the movable object.

Referring to the system shown in FIG. 6, an example in which the first direction 612 is a direction of a straight line perpendicular to a connection line between the upper arm and the lower arm of the robotic arm when the robotic arm extends, that is, a direction of the horizontal line perpendicular to the robotic arm when the robotic arm extends, the second direction 614 is a direction of the connection line between the upper arm and the lower arm of the robotic arm when the robotic arm extends, that is, a direction of the extension line of the robotic arm when the robotic arm extends, and the perpendicular direction is perpendicular to the connection line between the two ends of the robotic arm when the robotic arm extends is used, and any two of the first direction 612 (namely, the x direction), the second direction 614 (namely, the y direction), and the perpendicular direction (namely, the z direction) are perpendicular. For example, a three-dimensional space is formed by the x direction, the y direction, and the z direction.

A first plane and a second plane are formed in the three-dimensional space. The first plane is configured for indicating a two-dimensional plane constructed by the first direction and the perpendicular direction (which may alternatively be understood as an XOZ plane), and the second plane is configured for indicating another two-dimensional plane constructed by the second direction and the perpendicular direction (which may alternatively be understood as a YOZ plane). After the dynamic system is constructed, system modeling may be performed, to determine the mapping relationship between the posture information and the control information.

In some embodiments, a 2-dimensional (2D) model may be constructed based on the XOZ plane and the YOZ plane, and mapping relationships in the XOZ plane and the YOZ plane may be respectively determined based on the XOZ plane and the YOZ plane. In some embodiments, the mapping relationship includes a first mapping relationship and a second mapping relationship. The first mapping relationship is configured for describing a mapping relationship between first posture information in the first plane (namely, the XOZ plane) and first control information, and the second mapping relationship is configured for describing a mapping relationship between second posture information in the second plane (namely, the YOZ plane) and second control information. In some other embodiments, a 3-dimensional (3D) model may be constructed based on the three-dimensional space, and the mapping relationship is determined based on the three-dimensional space. In some embodiments, the mapping relationship includes a third mapping relationship. The third mapping relationship is configured for describing a mapping relationship between third posture information in the three-dimensional space and third control information. For different models, constructed mapping relationships are also different.

For example, kinetic energy and potential energy in the first plane and the second plane are determined, where the kinetic energy and the potential energy are configured for constructing a Euler-Lagrange equation respectively based on the first plane and the second plane; and the first mapping relationship and the second mapping relationship are determined based on the Euler-Lagrange equation. For another example, kinetic energy and potential energy in the three-dimensional space are determined, where the kinetic energy and the potential energy are configured for constructing a Euler-Lagrange equation based on the three-dimensional space; and the third mapping relationship is determined based on the Euler-Lagrange equation.

A difference exists between kinetic energy and potential energy determined based on the first plane, the second plane, and the three-dimensional space, consequently, a difference also exists between constructed Euler-Lagrange equations, and therefore, the determined mapping relationships are affected, to obtain the first mapping relationship, the second mapping relationship, and the third mapping relationship.

For example, after the mapping relationship between the posture information and the control information is constructed, the controller of the robotic arm obtains the posture information, and then can determine the control information. Based on different mapping relationships, the obtained control information is different.

In some embodiments, the control information includes first control information and second control information. The controller may determine the first control information based on the first mapping relationship, and determine the second control information based on the second mapping relationship. The first control information includes a first control moment applied in a roll direction in which the robotic arm rotates around the first rotation axis, the second control information includes a second control moment applied in a pitch direction in which the robotic arm rotates around the second rotation axis, the first rotation axis is the straight line perpendicular to the connection line between the two ends of the robotic arm when the robotic arm extends, and the second rotation axis is the extension line of the connection line between the two ends when the robotic arm extends.

In some other embodiments, the control information includes third control information. The controller may determine the first control information and the second control information based on the third mapping relationship. The first control information may alternatively be understood as the first control moment, and the second control information may alternatively be understood as the second control moment.

Operation 160: Control movement of the robotic arm according to the control information, to cause the movable object to reach a balanced state on the robotic arm.

After the control information is determined, the robotic arm may be controlled based on the control information. Referring to the foregoing content, the control information includes the first control information and the second control information. The first control information is configured for indicating the first control moment, and the second control information is configured for indicating the second control moment. Alternatively, the control information includes the third control information, and the third control information includes the first control moment and/or the second control moment. The control information includes the first control moment and the second control moment.

In some embodiments, the control information includes the first control moment, and operation 160 may be implemented as: controlling, based on the first control moment, the robotic arm to move around the first rotation axis. A direction of the first rotation axis is the first direction in FIG. 6, and for example, the direction of the first rotation axis is the direction of the horizontal plane perpendicular to the robotic arm when the robotic arm extends. In some other embodiments, the control information includes the second control moment, and operation 160 may be implemented as: controlling, based on the second control moment, the robotic arm to move around the second rotation axis. A direction of the second rotation axis is the second direction in FIG. 6, and for example, the direction of the second rotation axis is the direction of the extension line of the robotic arm when the robotic arm extends. Referring to the foregoing content, the controller control the robotic arm based on the control information, so that the movable object remains balanced on the robotic arm. Based on this, operation 160 may be implemented as: controlling, according to the control information, the robotic arm to perform at least one movement behavior, to cause the movable object to be in the balanced state on the robotic arm, where the movement behavior of the robotic arm includes at least one of the following behaviors: remaining relatively stationary, moving, or rotating.

The control information is a moment sequence formed by control moments of the joints of the robotic arm, and movement control of the joints of the robotic arm is implemented based on the moment sequence. Based on interaction of the control moments of the joints, the robotic arm visually presents two states: a stationary state and a moving state. That the robotic arm visually presents the stationary state may be understood as that a movement behavior of the robotic arm is remaining relatively stationary. In other words, based on control of the joints of the robotic arm, the robotic arm visually presents a representation that the robotic arm is stationary. That the robotic arm visually presents the moving state may be understood as that the movement behavior of the robotic arm is moving and/or rotating. In other words, based on control of the joints of the robotic arm, the robotic arm can visually present a representation that the robotic arm is moving. The moving may be movement and/or rotation of the robotic arm. For example, the robotic arm swings up and down by using the shoulder joint as a center, or the robotic arm rotates left and right by using the shoulder joint as a rotation center.

For example, the balanced state is configured for indicating that the movable object is in a state of mechanical equilibrium. In this case, the movable object may no longer move, or may be in a state of uniform linear motion relative to the robotic arm; further, a motion speed of the movable object is less than a preset speed, for example, 1 centimeter per second; and this is also referred to as a state of small amplitude movement. Further, the balanced state is configured for indicating a state in which the movable object is in the state of force-bearing balance and no longer moves (the movable object and the robotic arm remain relatively stationary). The balanced state may include the following two types: a statically balanced state, where the movable object in the statically balanced state is stationary on the robotic arm (or it may be understood as that the movable object is stationary relative to the robotic arm); and a dynamically balanced state, where the movable object in the dynamically balanced state displaces or rolls on the robotic arm (or it may be understood as that the movable object displaces or rolls relative to the robotic arm). In some embodiments, the movable object in the dynamically balanced state is in a state in which the movable object displaces or rolls on the robotic arm but remains on the robotic arm without falling. This embodiment does not limit a speed and a direction of displacing or rolling of the movable object on the robotic arm. The control information determined based on the mapping relationship enables the robotic arm to perform at least one movement behavior, so that the movable object is always stationary on the robotic arm, or a relative position of the movable object and the robotic arm is changed but the movable object does not fall off the robotic arm.

An example in which the movable object is a bottle is used, and the bottle is placed on the lower arm of the robotic arm. After determining the control information, the controller controls the joints of the robotic arm to move based on the control information. The bottle may be kept relatively stationary on the lower arm of the robotic arm, and in this case, the robotic arm may remain relatively stationary or perform fine adjustment in the x or y direction. Alternatively, the bottle may roll on the lower arm of the robotic arm, and the robotic arm may remain relatively stationary or perform fine adjustment in the x or y direction, so that the bottle does not fall off the robotic arm.

The controlling the robotic arm based on the control information is a continuous process. For example, operation 160 may be implemented as follows:

controlling movement of the robotic arm at a second moment by using control information at a first moment;

controlling movement of the robotic arm at a third moment by using control information at the second moment; and repeatedly performing the foregoing operations, until the robotic arm enables the movable object to reach the balanced state on the robotic arm at an $n^{th}$ moment.

The first moment is earlier than the second moment, the second moment is earlier than the third moment, and the third moment is earlier than the $n^{th}$ moment, where n is a positive integer greater than 3. Further, a time interval between the first moment and the second moment is less than a preset interval, and the preset interval is predetermined based on response time of the robotic arm for the control information. For example, the preset interval decreases as the response time of the robotic arm for the control information decreases. For example, when the time interval between the first moment and the second moment is less than the preset interval, movement of the robotic arm is controlled according to the control information obtained at the first moment, so that the movable object reaches the balanced state on the robotic arm. Similarly, a time interval between the second moment and the third moment is less than the preset interval.

After the dynamic system is constructed, control information at a next moment can be determined based on posture information at a current moment, and movement of the robotic arm at the next moment is controlled based on the control information. Subsequently, control information at a moment after the next moment can be determined based on posture information at the next moment, and the robotic arm is controlled to move based on the control information. After the foregoing operations are repeatedly performed one or more times, the movement of the robotic arm at a moment can cause the movable object to reach the balanced state on the robotic arm, and in this case, the movement control of the robotic arm is stopped. In other words, after the control information at the next moment is determined based on the posture information at the current moment, the robotic arm moves, so that the posture information at the next moment changes. Subsequently, a state of the movable object at the next moment may be determined. In this case, the next moment is reached, and the next moment becomes a new current moment. If the movable object reaches the balanced state on the robotic arm, the control of the robotic arm is stopped. If the movable object does not reach the balanced state, posture information and expected posture information of a new next moment (relative to the new current moment) are continuously obtained, and the control of the robotic arm is repeatedly implemented, until the movement of the robotic arm is controlled to cause the movable object to reach the balanced state on the robotic arm.

In conclusion, the embodiments of present disclosure provide a new use method for a robotic arm, to keep the movable object balanced at any position on the robotic arm other than an end without falling. Based on the mapping relationship between the posture information and the control information, the control information of the robotic arm can be determined, to implement control of the robotic arm.

Figure 7:
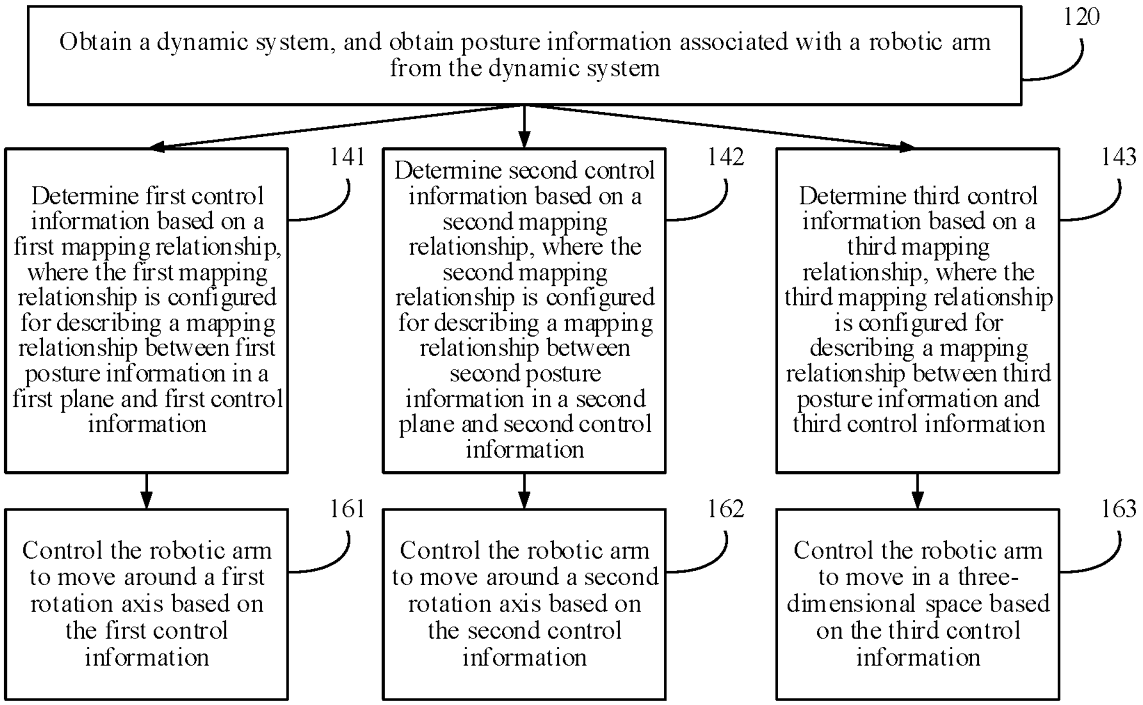
FIG. 7 is a flowchart of a robotic arm control method according to an exemplary embodiment of present disclosure.

Referring the foregoing content, based on different modeling manners, mapping relationships between the posture information and the control information are different. FIG. 7 is a flowchart of a robotic arm control method according to an exemplary embodiment of present disclosure. In other words, in the embodiment shown in FIG. 4, operation 140 may be implemented as operation 141 and operation 142, and operation 160 may be implemented as operation 161 and operation 162, to implement determining of a mapping relationship in a 2D model. Operation 140 may alternatively be implemented as operation 143, and operation 160 may alternatively be implemented as operation 163, to determine a mapping relationship in a 3D model. The mapping relationship can be determined in only one manner, and cannot be determined in two manners at the same time. In other words, operation 141 cannot be performed together with operation 143, and operation 142 cannot be performed together with operation 143.

For example, this embodiment of present disclosure provides two methods for determining the control information. Details are as follows:

I. In a 2D Model, the Control Information is Determined Based on the First Mapping Relationship and the Second Mapping Relationship In some embodiments, the posture information includes the first posture information and the second posture information, the mapping relationship includes the first mapping relationship and the second mapping relationship, and the control information includes the first control information and the second control information. The first posture information is configured for indicating a posture of a projection of the robotic arm in a first plane, and the second posture information is configured for indicating a posture of the robotic arm relative to a horizontal plane. In this case, operation 140 may be implemented as operation 141 and operation 142, and operation 160 may be implemented as operation 161 and operation 162. Details are as follows:

Operation 141: Determine the first control information based on the first mapping relationship.

Operation 142: Determine the second control information based on the second mapping relationship.

For example, the first mapping relationship is configured for describing a mapping relationship between the first posture information in the first plane and the first control information, and the first control information is configured for controlling the robotic arm to move around the first rotation axis; and the second mapping relationship is configured for describing a mapping relationship between the second posture information in the second plane and the second control information, and the second control information is configured for controlling the robotic arm to move around the second rotation axis, For example, operation 141 may be performed before, after, or simultaneously with operation 142. A sequence of performing operation 141 and operation 142 is not limited in present disclosure.

Operation 161: Control the robotic arm to move around the first rotation axis based on the first control information.

Operation 162: Control the robotic arm to move around the second rotation axis based on the second control information.

For example, the first plane is configured for indicating a two-dimensional plane constructed by a first direction and a perpendicular direction perpendicular to a connection line between two ends of the robotic arm when the robotic arm extends, the second plane is configured for indicating another two-dimensional plane constructed by the second direction and the perpendicular direction, the first direction is a direction of the straight line perpendicular to the connection line between the two ends of the robotic arm when the robotic arm extends, the second direction is a direction of the connection line between the two ends of the robotic arm when the robotic arm extends, any two of the first direction, the second direction, and the perpendicular direction are perpendicular, the first rotation axis is a straight line perpendicular to the connection line between the two ends of the robotic arm when the robotic arm extends, the first rotation axis is located at an end of the robotic arm close to a shoulder joint of the robotic arm, the second rotation axis is an extension line of the connection line between the two ends of the robotic arm when the robotic arm extends, and the second rotation axis passes through a center of the robotic arm. For example, operation 161 may be performed before, after, or simultaneously with operation 162. A sequence of performing operation 161 and operation 162 is not limited in present disclosure. Referring to FIG. 6, the first direction, the second direction, and the perpendicular direction are respectively the x, y, and z directions, the first plane is the XOZ plane, and the second plane is the YOZ plane. After the dynamic system is constructed based on the robotic arm and the movable object, a three-dimensional space may be constructed based on the first direction, the second direction, and the perpendicular direction. The three-dimensional space includes the first plane and the second plane.

Referring to the foregoing content, because the robotic arm can rotate in the x or y direction, based on 2D modeling, mapping relationships between the posture information and the control information may be respectively constructed in the XOZ plane and the YOZ plane, to respectively implement control in the x or y direction. In some embodiments, the first posture information includes a first rotation angle of the robotic arm in the first plane (which may be understood as the XOZ plane), the first control information includes a first control moment applied in a roll direction in which the robotic arm rotates around the first rotation axis (which may be understood as the x-axis). In this case, operation 141 may be implemented as follows: determining the first control moment based on the first mapping relationship between the first rotation angle and the first control moment. The first rotation angle is configured for indicating an angle by which the robotic arm rotates relative to a world coordinate system in the first plane. For construction of the world coordinate system, refer to FIG. 6. The world coordinate system is constructed based on that the robotic arm is in an initial posture, and the robotic arm in the initial posture remains parallel to the ground.

For example, the first rotation angle may be represented as $\varphi$, and the first control moment may be represented as $\tau_1$, and the first mapping relationship may be represented as $f_1$. In the XOZ plane, the posture information and physical information may be determined based on the dynamic systems of the robotic arm and the movable object. The posture information may include a second rotation angle (which may be represented as $\theta$) of the movable object in the XOZ plane. Subsequently, kinetic energy (which may be represented as T) and potential energy (which may be represented as U) in the XOZ plane may be determined, to construct a Euler-Lagrange equation in the XOZ plane. The Euler-Lagrange equation constructed based on the XOZ plane may be represented as L=T−U.

Subsequently, description equations of a dynamical model in different degrees of freedom may be obtained based on the Euler-Lagrange equation. In other words, a plurality of dynamical equations may be obtained based on the Euler-Lagrange equation, and each dynamical equation is constructed based on a degree of freedom. For example, in the XOZ plane, a dynamic first equation constructed based on a first degree of freedom (which may be understood as $\varphi$ degree of freedom) and a dynamic second equation constructed based on a second degree of freedom (which may be understood as $\theta$ degree of freedom) may be obtained based on the Euler-Lagrange equation. Based on this, the first mapping relationship may be obtained through simple operation of the dynamic first equation and the dynamic second equation (for example, in a manner of substituting the dynamic second equation into the dynamic first equation described in detail below by using a specific embodiment). Construction of the first mapping relationship is based on the Euler-Lagrange equation in the XOZ plane, and conforms to constraint of the dynamic system, and can accurately reflect the first mapping relationship between the first posture information and the first control information. After the first mapping relationship is determined, if obtaining the first posture information, the controller may determine the first control information based on the first mapping relationship, to implement movement of the robotic arm on the first rotation axis.

In some other embodiments, the second posture information includes the included angle between the robotic arm and the horizontal plane, and the second control information includes the second control moment applied in the pitch direction in which the robotic arm rotates around the second rotation axis (which may be understood as the y-axis). In this case, operation 142 may be implemented as follows: determining the second control moment based on the second mapping relationship between the included angle and the second control moment. The included angle is configured for indicating an angle by which the movable object rotates in the second plane relative to a horizontal plane of the world coordinate system. For the construction of the world coordinate system, refer to FIG. 6. The world coordinate system is constructed based on that the robotic arm is in an initial posture, and the robotic arm in the initial posture remains parallel to the ground.

For example, the included angle may be represented as a, the second control moment may be represented as $\tau_2$, and the second mapping relationship may be represented as $f_2$.

In the YOZ plane, the posture information and physical information may be determined based on the dynamic systems of the robotic arm and the movable object. The posture information may include a linear distance (which may be represented as s) in the first direction between the center of the movable object and the center of the joint that controls the robotic arm to rotate. Subsequently, kinetic energy (which may be represented as T) and potential energy (which may be represented as U) in the YOZ plane may be determined, to construct a Euler-Lagrange equation in the YOZ plane. The Euler-Lagrange equation constructed based on the YOZ plane may be represented as L=T−U. Subsequently, description equations of a dynamical model in different degrees of freedom may be obtained based on the Euler-Lagrange equation. In other words, a plurality of dynamical equations may be obtained based on the Euler-Lagrange equation, and each dynamical equation is constructed based on a degree of freedom. For example, in the YOZ plane, a dynamic third equation constructed based on a third degree of freedom (which may be understood as s degree of freedom) and a dynamic fourth equation constructed based on a fourth degree of freedom (which may be understood as $\alpha$ degree of freedom) may be obtained based on the Euler-Lagrange equation. Based on this, the second mapping relationship may be obtained through simple operation of the dynamic third equation and the dynamic fourth equation. Similar to the construction of the first mapping relationship, construction of the second mapping relationship is also based on the Euler-Lagrange equation in the YOZ plane, conforms to constraint of the dynamic system, and can accurately reflect the second mapping relationship between the second posture information and the second control information.

After the second mapping relationship is determined, if obtaining the second posture information, the controller may determine the second control information based on the second mapping relationship, to implement movement of the robotic arm on the second rotation axis.

II. In a 3D Model, the Control Information is Determined Based on the Third Mapping Relationship In some other embodiments, the posture information includes third posture information, the mapping relationship includes a third mapping relationship, and the control information includes third control information. In this case, operation 140 may be implemented as operation 143, and operation 160 may be implemented as operation 163. Details are as follows:

Operation 143: Determine the third control information based on the third mapping relationship.

For example, the third mapping relationship is configured for describing a mapping relationship between the third posture information in a three-dimensional space and the third control information, and the third control information is configured for controlling the robotic arm to move in the three-dimensional space.

Operation 163: Control the robotic arm to move in the three-dimensional space based on the third control information.

For example, the three-dimensional space is constructed by the first direction, the second direction, and the perpendicular direction, the first direction is the direction of the straight line perpendicular to the connection line between the two ends of the robotic arm when the robotic arm extends, the second direction is the direction of the connection line between the two ends of the robotic arm when the robotic arm extends, the perpendicular direction is perpendicular to the connection line between the two ends of the robotic arm when the robotic arm extends, and any two of the first direction, the second direction, and the perpendicular direction are perpendicular; and the first plane and the second plane are formed in the three-dimensional space, the first plane is configured for indicating a two-dimensional plane constructed by the first direction and the perpendicular direction, and the second plane is configured for indicating another two-dimensional plane constructed by the second direction and the perpendicular direction. Referring to FIG. 6, the three-dimensional space can be constructed by using x, y, and z directions, and the three-dimensional space includes the first plane (namely, the XOZ plane) and the second plane (namely, the YOZ plane). There are two coordinate systems in the three-dimensional space. One is a coordinate system shown in FIG. 6, and the other is a world coordinate system constructed based that the robotic arm is in an initial posture.

In some embodiments, the third posture information includes: a linear distance in the first direction between the center of the movable object and the center of the joint that controls the robotic arm to rotate (namely, s), and the second rotation angle (namely, θ) of the movable object in the first plane. The third mapping relationship includes a first sub-mapping relationship and a second sub-mapping relationship. The third control information includes: the first control moment applied in the roll direction in which the robotic arm rotates around the first rotation axis, and the second control moment applied in the pitch direction in which the robotic arm rotates around the second rotation axis. In some embodiments, operation 143 may be implemented as follows: determining the first control moment based on the first sub-mapping relationship between the linear distance and the first control moment; and determining the second control moment based on the second sub-mapping relationship between the second rotation angle and second control moment. Operation 163 may be implemented as follows: controlling the robotic arm to move around the first rotation axis based on the first control information; and controlling the robotic arm to move around the second rotation axis based on the second control information. The first rotation axis is the horizontal line perpendicular to the robotic arm, and the second rotation axis is the extension line of the robotic arm.

Similar to the case of the 2D model, considering that the robotic arm rotates in the x or y direction, in the 3D model, the third mapping relationship between the posture information and the control information still needs to be respectively constructed based on the three-dimensional space. The third mapping relationship includes two sub-mapping relationships, which are respectively configured for determining the first control moment and the second control moment, to implement control of the robotic arm in the x or y direction. For example, the first control moment is represented as Tx, and the first sub-mapping relationship included in the third mapping relationship may be represented as $f_{31}$; and the second control moment is represented as $\tau_y$, and the second sub-mapping relationship included in the third mapping relationship may be represented as $f_{32}$.

Similar to the 2D model, in the three-dimensional space, the posture information and physical information may be determined based on the dynamic systems of the robotic arm and the movable object. Subsequently, kinetic energy and potential energy in the three-dimensional space may be determined, to construct a Euler-Lagrange equation in the three-dimensional space. Based on this, description equations of a dynamical model in different degrees of freedom may be obtained based on the Euler-Lagrange equation. The first mapping relationship may be obtained based on simple operation of the description equations. Construction of the third mapping relationship is based on the Euler-Lagrange equation in the three-dimensional space, conforms to constraint of the dynamic system, and can accurately reflect the third mapping relationship between the third posture information and the third control information.

After the third mapping relationship is determined, if obtaining the third posture information, the controller may determine the third control information based on the third mapping relationship, to implement movement of the robotic arm on the first rotation axis and the second rotation axis.

In conclusion, in the robotic arm control method provided in the embodiments of present disclosure, two implementations of determining the control information are provided, and the control information for controlling the robotic arm may be respectively determined in the 2D model and the 3D model.

When a 2D model is constructed, two controllers may be disposed in the robotic arm, and corresponding control information is respectively determined based on the first mapping relationship and the second mapping relationship, or one controller may be disposed to determine two pieces of control information. When a 3D model is constructed, one controller may be disposed in the robotic arm, to determine the control information based on the third mapping relationship. A quantity of controllers is not limited in present disclosure. An implementation of determining the control information based on the mapping relationship between the posture information and the control information falls within the protection scope of present disclosure, and details are not described herein again.

Figure 8:
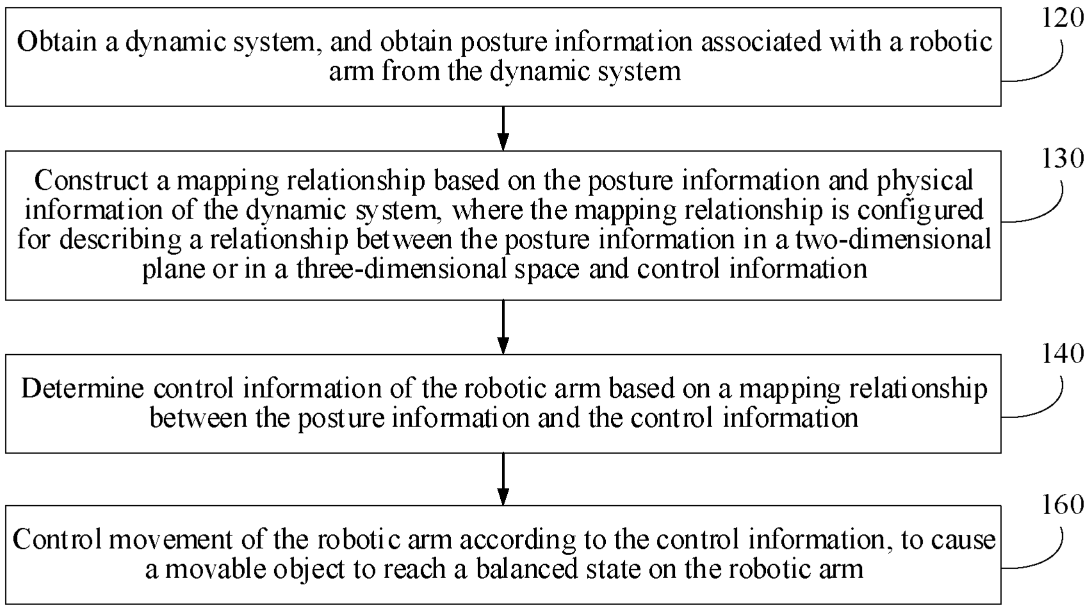
FIG. 8 is a flowchart of a robotic arm control method according to an exemplary embodiment of present disclosure.

Referring to the foregoing content, to determine the control information, the mapping relationship between the posture information and the control information needs to be constructed. FIG. 8 is a flowchart of a robotic arm control method according to an exemplary embodiment of present disclosure. For example, based on the embodiment shown in FIG. 4, the method further includes operation 130. Details are as follows:

Operation 130: Construct the mapping relationship based on the posture information and physical information of the dynamic system.

For example, the mapping relationship is configured for describing a relationship between the posture information in a two-dimensional plane or in a three-dimensional space and the control information. After a 2D/3D model is constructed, the posture information and/or the physical information of the dynamic system may be obtained.

In some embodiments, the posture information includes at least one piece of the following information: rotational inertia of the robotic arm, rotational inertia of the movable object, a first rotation angle of the robotic arm in a first plane, an included angle between the robotic arm and a horizontal plane constructed by a first direction and a second direction, a linear distance in the first direction between a center of the movable object and a center of a center that controls the robotic arm to rotate, and a second rotation angle of the movable object in the first plane. The first plane is configured for indicating a two-dimensional plane constructed by the first direction and a perpendicular direction perpendicular to a connection line between two ends of the robotic arm when the robotic arm extends, the first direction is a direction of a straight line perpendicular to the connection line between the two ends of the robotic arm when the robotic arm extends, the second direction is a direction of the connection line between the two ends of the robotic arm when the robotic arm extends, and any two of the first direction, the second direction, and the perpendicular direction are perpendicular. In some embodiments, the physical information includes at least one piece of the following information: mass of the robotic arm, a cross-sectional radius of the robotic arm, a length of a rigid body for balancing the movable object, mass of the movable object, a cross-sectional radius of the movable object, a position of a center of mass of the movable object, and a horizontal distance that is in an extension direction of the movable object and that is between a contact point between the movable object and the robotic arm and the center of mass of the movable object.

Referring to FIG. 6, the first direction, the second direction, and the perpendicular direction are respectively the x, y, and z directions, the first plane is the XOZ plane, and the second plane is the YOZ plane. For example, in the XOZ plane, the following posture information may be determined: the second rotation angle (which may be represented as θ) of the movable object in the first plane, the first rotation angle (which may be represented as q) of the robotic arm in the first plane, and rotational inertia of the robotic arm (which may be represented as $I_a$), and rotational inertia of the movable object (which may be represented as $I_b$). In addition, the following physical information may be determined: the horizontal distance (which may be represented as d) that is in the extension direction of the movable object and that is between the contact point between the movable object and the robotic arm and the center of mass of the movable object, the cross-sectional radius of the robotic arm (which may be represented as $r_a$), and the mass of the robotic arm (which may be represented as $m_a$). In the YOZ plane, the following posture information may be determined: the included angle between the robotic arm and the horizontal plane (which may be represented as α), the rotational inertia of the robotic arm (which may be represented as $I_a$), and the rotational inertia of the movable object (which may be represented as $I_b$). In addition, the following physical information may be determined: the linear distance in the first direction between the center of the movable object and the center of the joint that controls the robotic arm to rotate (which may be represented as s), the cross-sectional radius of the robotic arm (which may be represented as $r_a$), the cross-sectional radius of the movable object (which may be represented as $r_b$), and the mass of the robotic arm (which may be represented as $m_a$).

In the three-dimensional space, the following posture information may be determined: rotational inertia of the robotic arm in a third direction and a fourth direction (which may be represented as $I_{ax}$ and $I_{ay}$), and rotational inertia of the movable object in the third direction and the fourth direction (which may be represented as $I_{bx}$ and $I_{by}$). In addition, the following physical information may be determined: a position of a center of mass of the movable object (which may be represented as C). The third direction and the fourth direction are an x direction and a y direction in a robotic arm coordinate system constructed based on the robotic arm. The construction of the robotic arm is shown in FIG. 6. Coordinate axes of the world coordinate system constructed based on that the robotic arm is in the initial posture are fixed, and coordinate axes of the robotic arm coordinate system change with the movement of the robotic arm.

Referring to the foregoing content disclosed herein, regardless of the two-dimensional plane or the three-dimensional space, after the posture information and the physical information of the dynamic system are obtained, the mapping relationship in the corresponding model may be constructed. Constructing the mapping relationship provided in operation 130 in this embodiment may be performed before, after, or simultaneously with operation 120, which is not limited in present disclosure. The mapping relationship used in determining the control information in operation 140 in this embodiment is obtained through construction in operation 130. In other words, the mapping relationship obtained through construction in operation 130 is configured for controlling the movement of the robotic arm in a subsequent operation of determining the control information.

In some embodiments, to obtain the posture information, operation 120 may be implemented as follows:

obtaining the posture information from the dynamic system based on a visual sensor; or obtaining the posture information from the dynamic system based on the visual sensor and a tactile sensor. In the foregoing operation, the dynamic system needs to be constructed first, and reference may be made to the foregoing content. Details are not repeated herein. For example, the visual sensor is disposed on the robotic arm, or disposed outside the robotic arm; and the tactile sensor is laid on a housing of the robotic arm, to be used as electronic skin of the robotic arm. For example, a joint motor encoder is mounted on a joint motor of the robotic arm, to feed back information about angles, angular velocities, and current of joints, and the information can be configured for estimating a status of the robotic arm. For another example, the tactile sensor is laid on a finger, a palm, and a link of the robotic arm, to obtain feedback information of the movable object.

In some embodiments, the posture information may be obtained through a proximity sensor. The proximity sensor is configured to send a signal when two objects approach. When the movable object approaches the proximity sensor, the posture information can be obtained. For example, for that the posture information includes the linear distance in the x direction between the center of the movable object and the center of the joint that controls the robotic arm to rotate, the proximity sensor is disposed on the movable object and the joint that controls the robotic arm to rotate. The signal sent by the proximity sensor is configured for indicating the linear distance in the x direction between the center of the movable object and the center of the joint that controls the robotic arm to rotate, to obtain the posture information.

For example, to obtain the posture information, present disclosure provides the three following implementations for selection.

Implementation 1: posture recognition of full degrees of freedom of the movable object based on visual perception.

The robotic arm of 7 degrees of freedom shown in FIG. 1 to FIG. 3 is used as an example, the posture recognition of full degrees of freedom of the movable object may be obtained through the visual sensor, to determine a relative position relationship between the movable object and the robotic arm, to determine the posture information. For example, image information is obtained through the visual sensor, and image processing is performed, to determine the posture information of the movable object on the robotic arm, such as position information on the x, y, or z axis and a posture in the roll or pitch direction that are obtained based on image processing.

In some embodiments, operation time of the posture recognition is about 100 milliseconds, that is, 10 Hz.

Implementation 2: performing data image processing based on the visual sensor.

In some embodiments, lightweight data image processing manner may be used to determine a position of the movable object in the dynamic system. For example, a camera is disposed on the robotic arm or in an external environment, to obtain image information of the robotic arm and the movable object. The image information is configured for showing that the movable object is placed on the robotic arm. Subsequently, the image information is processed to obtain an image processing result. For example, after the image information is obtained, cluster analysis is performed based on different colors between the movable object and objects in an environment, to determine a geometric center of the movable object, and a position of the geometric center and a position of a center of mass in the dynamic system can be determined subsequently. Based on this, with reference to the related information of the robotic arm, the posture information can be obtained, for example, a contact position is determined based on the geometric center of the movable object. In some embodiments, an operation speed of the lightweight calculation based on this implementation is fast, and operation time is about 10 milliseconds, that is, 10 Hz.

In some embodiments, obtaining the posture information through the visual sensor may be implemented as follows:

obtaining the image information through the visual sensor, where the image information is configured for presenting that the movable object is placed on the robotic arm; processing the image information to obtain the image processing result; and determining the posture information based on the image processing result.

Alternatively, in some embodiments, obtaining the posture information through the visual sensor and the tactile sensor may be implemented as follows:

determining first information of the movable object in a first direction through the visual sensor; determining second information of the movable object in a second direction through the tactile sensor; and performing fusion processing on the first information and the second information, to obtain the posture information.

The first direction is a direction of a straight line perpendicular to the connection line between the two ends of the robotic arm when the robotic arm extends, and the second direction is a direction of the connection line between the two ends of the robotic arm when the robotic arm extends.

Referring to FIG. 6, after the coordinate system is constructed based on the robotic arm, there are the first direction (which may be understood as the x direction) and the second direction (which may be understood as the y direction), and the movable object can perform description of relative positions and force interaction with the robotic arm in both the first and second directions. In the foregoing implementation, different sensors obtain descriptions in corresponding direction, to form corresponding first information and second information.

For example, the first information is the position of the geometric center and the position of the center of mass of the movable object that are obtained through image processing by the visual sensor; and the second information is a specific position of the movable object on the robotic arm obtained through the tactile sensor. Subsequently, based on fusing of the first information and the second information, the posture information may be determined, for example, the contact position between the movable object and the robotic arm.

For related content of determining the first information through the visual sensor, refer to the foregoing content. Details are not described herein again. Determining the second information through the tactile sensor and fusion processing are described below.

Implementation 3: performing data fusion processing through the visual sensor and the tactile sensor.

In some embodiments, the posture information may alternatively be obtained through the visual sensor and the tactile sensor. For processing of the visual sensor, refer to the foregoing content. Processing of the tactile sensor is specifically as follows.

Based on the foregoing content, when the lightweight data image processing manner is used, a large error may be caused in a depth direction (in other words, a direction of the y-axis shown in FIG. 6) of the camera. Based on this, the tactile sensor may be used for compensation. For example, the tactile sensor is laid on the housing of the robotic arm, to collect a corresponding tactile signal when the movable object is placed on the robotic arm. Based on this, a specific position of the movable object in the x direction on the robotic arm can be accurately obtained.

The tactile sensor provides a position of the movable object in the y direction and a pitch angle posture. In addition, with reference to lightweight image processing of the visual sensor, compared with prior image data, the specific position of the movable object in the x direction on the robotic arm can be determined.

In some embodiments, operation time of the tactile sensor based on this implementation is about 10 milliseconds, that is, 100 Hz. Referring to the foregoing content, comparison between the three implementations is provided, as shown in the table below:

| Scheme | Operation period | Linear error | Angular error |
|---|---|---|---|
| Implementation 1 | 100 ms | 1 to 2 cm | 5 to 10 degrees |
| Implementation 2 | 10 ms | 1 cm | 5 degrees |
| Implementation 3 | 10 ms | 1 cm | 5 degrees |

In Implementation 1, for determining the position of the movable object on the robotic arm, there is a linear error of 1 to 2 centimeters and an angular error of 5 to 10 degrees, that is, the obtained posture information has a specific linear error and angular error. Similarly, in Implementations 2 and 3, there are also specific errors. Further, Implementation 3 is an improved implementation based on Implementation 2, which can overcome a disadvantage of inaccurate measurement of the center of mass in the direction of the y-axis in Implementation 2, so that an error of the obtained posture information is smaller.

If the robotic arm control method provided in present disclosure is adopted, a proper implementation may be selected based on an actual requirement, to obtain the posture information. This is not limited in present disclosure.

Referring to the foregoing content, obtaining the posture information based on the visual sensor and the tactile sensor may be implemented as: determining the first information of the movable object in the first direction through the visual sensor; determining the second information of the movable object in the second direction through the tactile sensor; and performing the fusion processing on the first information and the second information, to obtain the posture information.

In some embodiments, determining of the second information may be specifically implemented as: determining position information of contact point between the movable object and the robotic arm relative to the robotic arm through the tactile sensor.

The position information determined based on this includes at least position coordinates of the contact position between the movable object and the robotic arm. For related content of obtaining the position information by the tactile sensor, refer to the foregoing content. Details are not described herein again. In some embodiments, the tactile sensor is laid on a housing of the robotic arm. The tactile sensor is configured to obtain related information of the contact position between the movable object and the robotic arm, including the position coordinates and moment information of the contact position.

Referring to the foregoing content, the first information is data of visual perception, the second information is data of tactile perception, and the two pieces of data may be fused. In some embodiments, the fusion processing may use any one or more of the following algorithms: a Kalman filtering (KF) algorithm, an extended Kalman filtering (EKF) algorithm, and a particle filter (PF) algorithm.

There are a plurality of implementations of data fusion processing. The foregoing content is merely an exemplary example, and does not constitute a limitation to present disclosure. In addition, as the fusion processing manner is updated, fusion processing that occurs after present disclosure is also applicable to present disclosure, that is, a result of the fusion processing does not constitute a limitation on the robotic arm control method provided in present disclosure.

In conclusion, according to the robotic arm control method provided in the embodiments of present disclosure, a manner of construction of a mapping relationship is provided. Based on posture information and physical information of a dynamic system, the mapping relationship between posture information in a two-dimensional plane or a three-dimensional space and control information can be determined, thereby determining the control information, to control the robotic arm, and ensure that a movable object is in a balanced state on the robotic arm.

Based on the foregoing content, determining the control information based on the first mapping relationship and the second mapping relationship corresponds to a 2D modeling manner; and determining the control information based on the third mapping relationship corresponds to a 3D modeling manner; it can be seen that there are two parallel modeling manners, namely, 2D modeling or 3D modeling. In different modeling, the construction of the mapping relationship is different.

Figure 9:
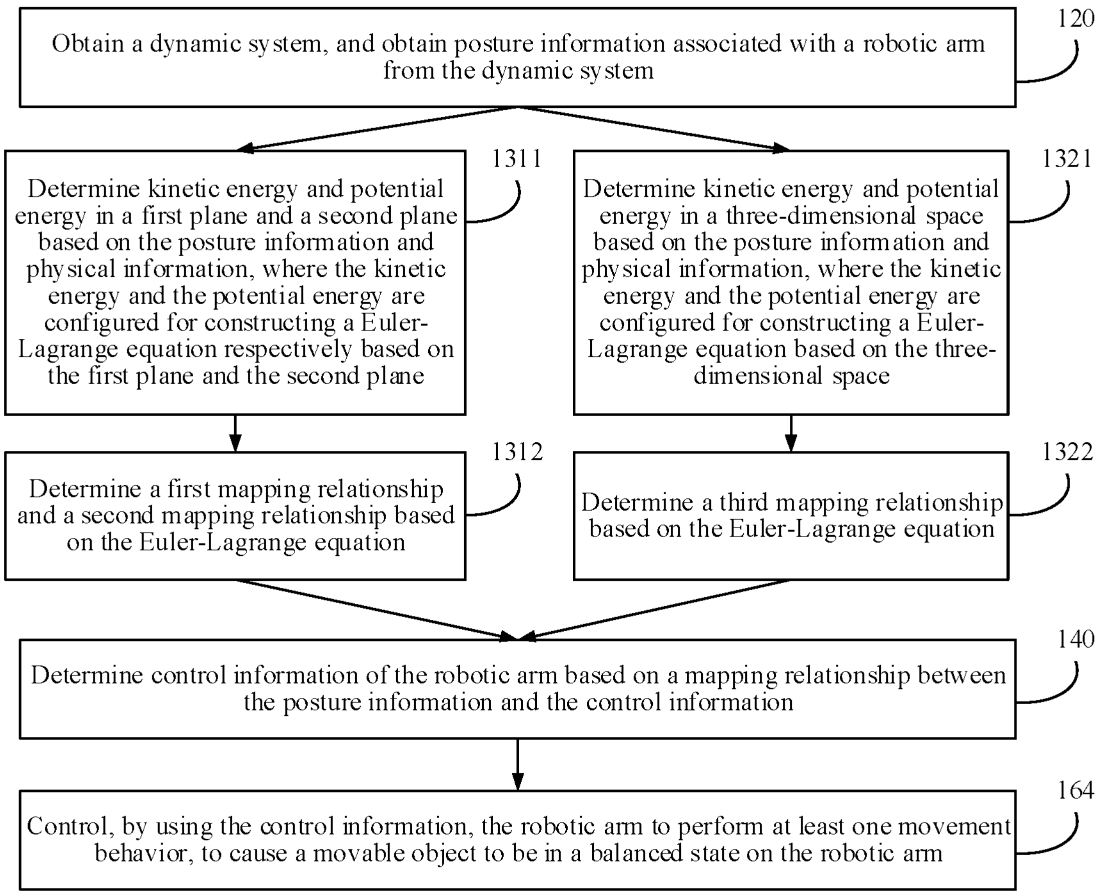
FIG. 9 is a flowchart of a robotic arm control method according to an exemplary embodiment of present disclosure.

FIG. 9 is a flowchart of a robotic arm control method according to an exemplary embodiment of present disclosure. In other words, in the embodiment shown in FIG. 4, operation 130 may be implemented as operation 1311 and operation 1312, or operation 130 may be implemented as operation 1321 and operation 1322, and operation 160 may be implemented as operation 164. One of operation 1311 and operation 1312 may be selected to be performed, but operation 1311 and operation 1312 cannot be performed at the same time.

This embodiment of present disclosure provides two implementations of construction of the mapping relationship, which are specifically as follows:

I. In a 2D model, the first mapping relationship and the second mapping relationship are constructed.

II. In a 3D model, the third mapping relationship is constructed.

The foregoing two implementations of construction of the mapping relationship and the foregoing solutions of determining the control information may be in a one-to-one correspondence. For example, that in the 2D model, the first mapping relationship and the second mapping relationship are constructed may be combined with the foregoing technical solution of determining the control information based on the first mapping relationship and the second mapping relationship in the 2D model into a new embodiment for joint implementation. Similarly, that in the 3D model, the third mapping relationship is constructed may be combined with the foregoing technical solution of determining the control information based on the third mapping relationship in the 3D model into a new embodiment for joint implementation. This is not limited in present disclosure. In the context, the first mapping relationship, the second mapping relationship, and the third mapping relationship are not fully introduced in the above due to space limitations. Reference may be made to the various embodiments of the implementations of construction of the mapping relationship and obtaining the mapping relationship, which is not limited in present disclosure.

The foregoing two implementations are specifically introduced as follows.

I. In a 2D model, the first mapping relationship and the second mapping relationship are constructed.

In some embodiments, the mapping relationship includes the first mapping relationship and the second mapping relationship. In this case, operation 130 may be implemented as operation 1311 and operation 1312. Details are as follows:

Operation 1311: Determine kinetic energy and potential energy in the first plane and the second plane based on the posture information and the physical information, where the kinetic energy and the potential energy are configured for constructing a Euler-Lagrange equation respectively based on the first plane and the second plane.

Operation 1312: Determine the first mapping relationship and the second mapping relationship based on the Euler-Lagrange equation.

For example, the first mapping relationship is configured for describing a mapping relationship between first posture information in the first plane and first control information, the second mapping relationship is configured for describing a mapping relationship between second posture information in the second plane and second control information, the first plane is configured for indicating a two-dimensional plane constructed by a first direction and a perpendicular direction perpendicular to a connection line between two ends of the robotic arm when the robotic arm extends, the second plane is configured for indicating another two-dimensional plane constructed by a second direction and the perpendicular direction, the first direction is a direction of a straight line perpendicular to the connection line between the two ends of the robotic arm when the robotic arm extends, the second direction is a direction of the connection line between the two ends of the robotic arm when the robotic arm extends, and any two of the first direction, the second direction, and the perpendicular direction are perpendicular.

The mapping relationship is mainly determined based on the Euler-Lagrange equation.

For example, a partial derivative is solved for each degree of freedom in the kinetic energy and the potential energy, to obtain different partial derivatives. A plurality of dynamical equations may be then determined based on the Euler-Lagrange equation, and each dynamical equation is constructed based on a degree of freedom. Finally, the first mapping relationship and the second mapping relationship are determined based on at least one dynamical equation.

Referring to the foregoing content, in some embodiments, the first mapping relationship may be determined as follows: obtaining, based on the Euler-Lagrange equation, a dynamic first equation constructed based on a first degree of freedom and a dynamic second equation constructed based on a second degree of freedom; and determining the first mapping relationship based on the dynamic first equation and the dynamic second equation.

The first degree of freedom is a degree of freedom corresponding to the second rotation angle of the robotic arm in the first plane, the dynamic first equation is configured for describing a drive constraint on the robotic arm in the first plane, the second degree of freedom is a degree of freedom corresponding to the first rotation angle of the movable object in the first plane, and the dynamic second equation is configured for describing a drive constraint on the movable object in the first plane.

Referring to the foregoing content, in some embodiments, the second mapping relationship may be determined as follows: obtaining, based on the Euler-Lagrange equation, a dynamic third equation constructed based on a third degree of freedom and a dynamic fourth equation constructed based on a fourth degree of freedom; and determining the second mapping relationship based on the dynamic third equation and the dynamic fourth equation.

The third degree of freedom is a degree of freedom corresponding to a linear distance in the first direction between a center of the movable object and a center of a joint that controls the robotic arm to rotate, the dynamic third equation is configured for describing a drive constraint on the movable object in the second plane, the fourth degree of freedom is a degree of freedom corresponding to an included angle between the robotic arm and a horizontal plane, and the dynamic fourth equation is configured for describing a drive constraint on the robotic arm in the second plane.

Referring to FIG. 6, it is considered that the robotic arm is located in the world coordinate system, and the world coordinate system is constructed based on that the robotic arm is in the initial state. The direction of the extension line of the robotic arm is a positive direction of the y-axis; in the initial state, a direction perpendicular to the y-axis and parallel to the ground is the direction of the x-axis; when standing in the same direction with the robotic arm, a direction of the right hand is a positive direction of the x-axis; a direction opposite to the gravity is vertical upward, a direction perpendicular to the ground is the z axis; and a space rectangular coordinate system, namely, the world coordinate system, is constructed based on this.

Figure 10:
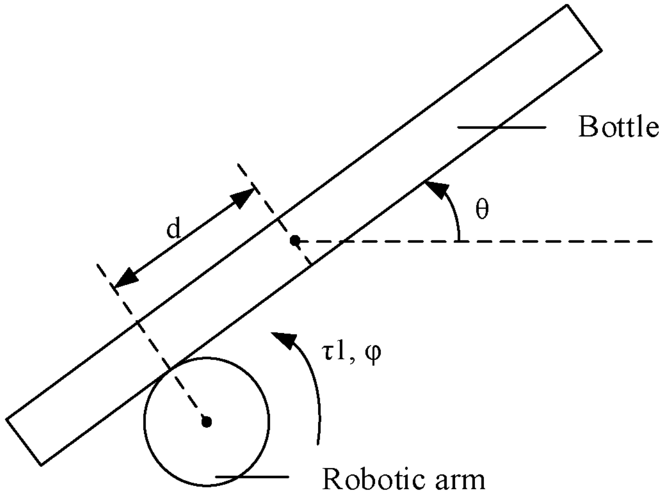
FIG. 10 is a schematic diagram of a two-dimensional plane of a robotic arm according to an exemplary embodiment of present disclosure.

An example in which the first plane is the XOZ plane, the movable object is a bottle, and the bottle is placed on the lower arm of the robotic arm is used, and a 2D model in the XOZ plane may be simplified as FIG. 10. The lower circle represents a cross section of the lower arm of the robotic arm, and the rectangle represents a cross section of the bottle. To simplify model description of the bottle, changes of a shape and a cross-sectional area of a head and a bottom of the bottle are ignored, the bottle is considered as a homogeneous rigid body, and a position of the bottle is evaluated by using a center of mass of the bottle. In addition, the bottle and the lower arm of the robotic arm are approximately perpendicularly disposed. Therefore, the cross section of the bottle is a rectangle.

Based on this, the following posture information may be determined: a first rotation angle of the robotic arm in the first plane (which is represented as $\varphi$), a second rotation angle of the movable object in the first plane (which is represented as $\theta$), rotational inertia of the robotic arm (which is represented as $I_a$), and rotational inertia of the movable object (which is represented as $I_b$). In addition, the following physical information may be determined: the horizontal distance (which is represented as d) that is in the extension direction of the movable object and that is between the contact point between the movable object and the robotic arm and the center of mass of the movable object, the cross-sectional radius of the robotic arm (which is represented as $r_a$), and the mass of the robotic arm (which is represented as $m_a$).

For example, $\tau_1$ is configured for representing the first control moment, and may also be understood as a moment applied on a degree of freedom of a lower arm joint.

Based on this, a relationship between physical quantities can be obtained, which is specifically as follows:

$$d = \theta r_a - \varphi r_a; \text{ and}$$

$$\dot{d} = \dot{\theta} r_a - \dot{\varphi} r_a.$$

$\dot{d}$, $\dot{\theta}$, and $\dot{\varphi}$ are respectively configured for indicating derivatives of d, $\theta$, and $\varphi$.

For example, a square of a motion speed (represented as v) of the bottle may be determined based on a dynamic system. Details are as follows:

$$v^2 = \dot{d}^2 + (d\dot{\theta})^2 = r_a^2\dot{\theta}^2 + r_a^2\dot{\varphi}^2 - 2r_a^2\dot{\theta}\dot{\varphi} + r_a^2\theta^2\dot{\theta}^2 + r_a^2\varphi^2\dot{\theta}^2 - 2r_a^2\theta\varphi\dot{\theta}^2.$$

Based on the Euler-Lagrange equation, kinetic energy and potential energy of all rigid bodies in a dynamic system in the XOZ plane need to be respectively solved. After the posture information and the physical information are determined, the kinetic energy and the potential energy in the XOZ plane need to be determined.

For example, a sum of the kinetic energy of all rigid bodies in the dynamic system may be represented as follows:

$$T = \frac{1}{2}m_b v^2 + \frac{1}{2}I_b\dot{\theta}^2 + \frac{1}{2}I_a\dot{\varphi}^2$$

$$U = m_b g \cdot d \sin\theta.$$

T represents the kinetic energy, U represents the potential energy, $v^2$ has been described above, $m_b$ is configured for indicating mass of the movable object, $I_a$ is configured for indicating the rotational inertia of the robotic arm, $I_b$ is configured for indicating rotational inertia of the movable object, and g is configured for indicating the gravitational acceleration.

Based on this, the kinetic energy can be partialized respectively for each degree of freedom (namely, $\theta$ and $\varphi$) and a derivative thereof (namely, $\dot{\theta}$ and $\dot{\varphi}$) in an extended coordinate system, to obtain the following formulas:

$$\frac{\partial T}{\partial \dot{\theta}} = m_b r_a^2\dot{\theta} - m_b r_a^2\dot{\varphi} + m_b r_a^2\theta^2\dot{\theta} + m_b r_a^2\varphi^2\dot{\theta} - 2m_b r_a^2\theta\varphi\dot{\theta} + I_b\dot{\theta};$$

$$\frac{\partial T}{\partial \dot{\varphi}} = m_b r_a^2\dot{\varphi} - m_b r_a^2\dot{\theta} + I_a\dot{\varphi};$$

$$\frac{\partial T}{\partial \theta} = m_b r_a^2\theta\dot{\theta}^2 - m_b r_a^2\varphi\dot{\theta}^2;$$

$$\frac{\partial T}{\partial \varphi} = m_b r_a^2\varphi\dot{\theta}^2 - m_b r_a^2\theta\dot{\theta}^2; \text{ and}$$

$$\frac{\partial U}{\partial \theta} = m_b g \cdot d \cos\theta.$$

$r_a$ is configured for indicating the cross-sectional radius of the robotic arm.

Subsequently, for $$\frac{\partial T}{\partial \dot{\theta}} \text{ and } \frac{\partial T}{\partial \dot{\varphi}},$$

time is respectively derived, to obtain the following formulas:

$$\frac{d}{dt}\frac{\partial T}{\partial \dot{\theta}} = m_b r_a^2 \ddot{\theta} - m_b r_a^2 \ddot{\varphi} + m_b r_a^2 \theta^2 \ddot{\theta} + 2 m_b r_a^2 \theta \dot{\theta}^2 + m_b r_a^2 \varphi^2 \ddot{\theta} + 2 m_b r_a^2 \varphi \dot{\varphi} \theta^2 - 2 m_b r_a^2 \varphi \dot{\theta}^2 - 2 m_b r_a^2 \theta \dot{\theta} \dot{\varphi} - 2 m_b r_a^2 \theta \varphi \ddot{\theta} + I_b \ddot{\theta}; \text{ and}$$

$$\frac{d}{dt}\frac{\partial T}{\partial \dot{\varphi}} = m_b r_a^2 \ddot{\varphi} - m_b r_a^2 \ddot{\theta} + I_a \ddot{\varphi}.$$

Subsequently, the dynamic first equation and the dynamic second equation may be obtained based on the Euler-Lagrange equation. A specific calculation process is as follows. Based on the Euler-Lagrange equation, the following two formulas are obtained:

$$\frac{d}{dt}\frac{\partial T}{\partial \dot{\theta}} - \frac{\partial T}{\partial \theta} + \frac{\partial U}{\partial \theta} = 0; \text{ and}$$

$$\frac{d}{dt}\frac{\partial T}{\partial \dot{\varphi}} - \frac{\partial T}{\partial \varphi} = \tau_1.$$

By substituting the foregoing items into the two formulas, the following dynamic first equation and dynamic second equation may be obtained:

$$m_b r_a^2 (1 + \theta^2 + \varphi^2 - 2\theta\varphi)\ddot{\theta} - m_b r_a^2 \ddot{\varphi} + m_b r_a^2 \theta \dot{\theta}^2 + 2 m_b r_a^2 \varphi \dot{\varphi} \dot{\theta} - m_b r_a^2 \varphi \dot{\theta}^2 - 2 m_b r_a^2 \theta \dot{\theta} \dot{\varphi} + m_b g d \cos\theta + I_b \ddot{\theta} = 0; \text{ and} \quad \text{(Formula A1)}$$

$$m_b r_a^2 \ddot{\varphi} - m_b r_a^2 \ddot{\theta} - m_b r_a^2 \varphi \dot{\theta}^2 + m_b r_a^2 \theta \dot{\theta}^2 + I_a \ddot{\varphi} = \tau_1. \quad \text{(Formula A2)}$$

The first line is configured for indicating a dynamical equation at θ degree of freedom (namely, the dynamic second equation). Because at the degree of freedom, actuation is lacked, actual input moment on the right side of the equation is 0. The second line is configured for indicating a dynamical equation at φ degree of freedom (namely, the dynamic first equation), and actuation at the degree of freedom is a moment $\tau_1$ of a motor.

Based on the dynamic second equation (namely, Formula A1), $\ddot{\theta}$ may be obtained, and $\ddot{\theta}$ is substituted into the dynamic first equation (namely, Formula A2), to determine the first mapping relationship $f_1$. After the first mapping relationship is determined, φ may be obtained by using a proportional-integral-differential (PID) controller. The PID controller is a feedback loop component used in industrial control application. Based on a control principle of the PID controller, collected data may be compared with a corresponding reference value (which may be understood as an expected value or a target value), and a difference between the collected data and the corresponding reference value is configured for calculating a new input value. An objective of the new input value is to enable data of a system to reach or remain the reference value.

$\tau_1$ may be then determined based on the first mapping relationship, to control the robotic arm to rotate around the first rotation axis.

Figure 11:
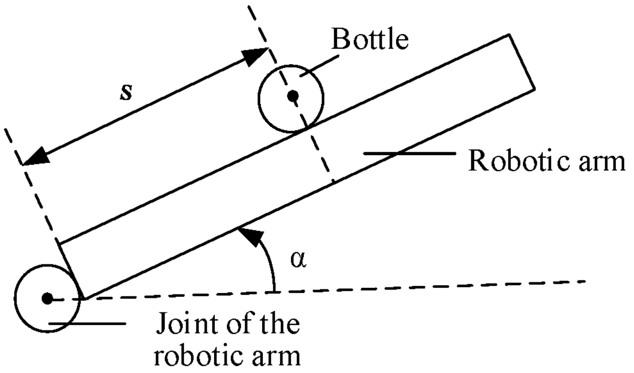
FIG. 11 is a schematic diagram of a two-dimensional plane of a robotic arm according to an exemplary embodiment of present disclosure.

An example in which the second plane is the YOZ plane, and the bottle is placed on the lower arm of the robotic arm is used, and a 2D model in the YOZ plane may be simplified as FIG. 11. A circle at the lower left corner is configured for representing a joint rotating around the lower arm of the robotic arm, a rectangle connected thereto is a cross section of the robotic arm, an included angle between the cross section and the horizontal direction of the world coordinate system is a, that is, an included angle between the robotic arm and a horizontal plane, and a circle located on the rectangle is a cross section of the bottle. Similarly, assuming that the bottle is perpendicular to the robotic arm, to simplify model description of the bottle, changes of a shape and a cross-sectional area of a head and a bottom of the bottle are ignored, the bottle is considered as a homogeneous rigid body, and a position of the bottle is evaluated by using a center of mass of the bottle.

Based on this, the following posture information may be determined: the included angle between the robotic arm and the horizontal plane (which may be represented as α), the rotational inertia of the robotic arm (which may be represented as $I_a$), and the rotational inertia of the movable object (which may be represented as $I_b$). In addition, the following physical information may be determined: the linear distance in the first direction between the center of the movable object and the center of the joint that controls the robotic arm to rotate (which may be represented as s), the cross-sectional radius of the robotic arm (which may be represented as $r_a$), the cross-sectional radius of the movable object (which may be represented as $r_b$), the mass of the robotic arm (which may be represented as $m_a$), and a length of a rigid body configured to balance the movable object (which may be represented as $I_a$).

For example, $\tau_2$ is configured for representing the second control moment, and may also be understood as a moment applied on a degree of freedom of a lower arm joint.

Based on this, a square of the motion speed (which may be represented as v) of the bottle in the world coordinate system, and the rotational angular velocity (which may be represented as w) of the bottle may be obtained. Details are as follows:

$$v^2 = \dot{s}^2 + (s\dot{\alpha})^2$$

$$\omega = \frac{\dot{s}}{r_b} + \dot{\alpha}$$

$\dot{s}$ and $\dot{\alpha}$ are respectively configured for indicating derivatives of s and α.

Based on the Euler-Lagrange equation, kinetic energy and potential energy of all rigid bodies in a dynamic system in the YOZ plane need to be respectively solved. After the posture information and the physical information are determined, the kinetic energy and the potential energy in the YOZ plane need to be determined.

For example, a sum of the kinetic energy of all rigid bodies in the dynamic system may be represented as follows:

$$T = \frac{1}{2} I_b \cdot \left(\frac{\dot{s}}{r_b} + \dot{\alpha}\right)^2 + \frac{1}{2} m_b (\dot{s}^2 + s^2 \dot{\alpha}^2) + \frac{1}{2} I_a \dot{\alpha}^2$$

$$U = \frac{1}{2} m_a g \cdot l_a \sin\alpha + m_b g s \cdot \sin\alpha$$

T represents the kinetic energy, U represents the potential energy, $v^2$ has been described above, s is configured for indicating the linear distance in the first direction between the center of the movable object and the center of the joint that controls the robotic arm to rotate, $r_b$ is configured for indicating the cross-sectional radius of the robotic arm, $m_a$ is configured for indicating mass of the robotic arm, $m_b$ is configured for indicating mass of the movable object, $I_a$ is configured for indicating the rotational inertia of the robotic arm, $I_b$ is configured for indicating rotational inertia of the movable object, $I_a$ is configured for indicating a length of a rigid body that balances the movable object, and g is configured for indicating the gravitational acceleration. Based on this, the kinetic energy can be partialized respectively for each degree of freedom (namely, s and a) and a derivative thereof (namely, $\dot{s}$ and $\dot{\alpha}$) in an extended coordinate system, to obtain the following formulas:

$$\frac{\partial T}{\partial \dot{s}} = \frac{I_b}{r_b}\left(\frac{\dot{s}}{r_b} + \dot{\alpha}\right) + m_b\dot{s}$$

$$\frac{\partial T}{\partial \dot{\alpha}} = I_b\left(\frac{\dot{s}}{r_b} + \dot{\alpha}\right) + \left(m_b s^2 + I_a\right)\dot{\alpha}$$

$$\frac{\partial U}{\partial s} = m_b g \sin\alpha$$

$$\frac{\partial U}{\partial \alpha} = \left(\frac{1}{2}m_a g l_a + m_b g s\right)\cos\alpha$$

Subsequently, for $$\frac{\partial T}{\partial \dot{s}} \text{ and } \frac{\partial T}{\partial \dot{\alpha}},$$

time is respectively derived, to obtain the following formulas:

$$\frac{d}{dt}\left(\frac{\partial T}{\partial \dot{s}}\right) = \left(\frac{T_b}{r_b^2} + m_b\right)\ddot{s} + \frac{I_b}{r_b}\ddot{\alpha}$$

$$\frac{d}{dt}\left(\frac{\partial T}{\partial \dot{\alpha}}\right) = \frac{I_b}{r_b}\ddot{s} + \left(I_b + I_a + m_b s^2\right)\ddot{\alpha} + 2m_b s\dot{s}\dot{\alpha}$$

$$\frac{\partial T}{\partial s} = m_b\dot{\alpha}^2 s$$

$$\frac{\partial T}{\partial \alpha} = 0.$$

Subsequently, the dynamic third equation and the dynamic fourth equation may be obtained based on the Euler-Lagrange equation. A specific calculation process is as follows.

$$\left(\frac{I_b}{r_b^2} + m_b\right)\ddot{s} + \frac{I_b}{r_b}\ddot{\alpha} - m_b s\dot{\alpha}^2 + m_b g \sin\alpha = 0 \quad \text{(Formula B1)}$$

$$\frac{I_b}{r_b}\ddot{s} + \left(I_b + Ia + m_b s^2\right)\dot{\alpha} + 2m_b s\dot{s}\ddot{\alpha} + \left(\frac{1}{2}m_a g l_a + m_b g s\right)\cos\alpha = \tau_2. \quad \text{(Formula B2)}$$

The first line is configured for indicating a dynamical equation at s degree of freedom (namely, the dynamic third equation, or Formula B1). Because at the degree of freedom, actuation is lacked, actual input moment on the right side of the equation is 0. The second line is configured for indicating a dynamical equation at a degree of freedom (namely, the dynamic fourth equation, or Formula B2), and actuation at the degree of freedom is a moment $\tau_2$ of a motor.

Based on the dynamic third equation (namely, Formula B1), $\ddot{s}$ may be obtained, and $\ddot{s}$ is substituted into the dynamic fourth equation (namely, Formula B2), to determine the second mapping relationship $f_2$. After the second mapping relationship is determined, the PID controller may obtain φ. $\tau_2$ may be then determined based on the second mapping relationship, to control the robotic arm to rotate around the second rotation axis.

II. In a 3D model, the third mapping relationship is constructed.

In some embodiments, based on a 2D model, control needs to be respectively performed based on the XOZ plane and the YOZ plane. However, there is a coupling between the two planes. The foregoing first mapping relationship and second mapping relationship ignore the coupling and do not consider the mutual coupling between the XOZ plane and the YOZ plane. The first control moment and the second control moment obtained thereby also ignore the coupling, and the first control moment and the second control moment are determined independently in the XOZ plane and the YOZ plane, resulting in insufficient control of the robotic arm.

Based on this, this embodiment of present disclosure provides construction of the third mapping relationship in a 3D model. When constructing the third mapping relationship, coupling between different planes (for example, the XOZ plane and the YOZ plane) is fully considered, thereby improving control precision of the robotic arm. In this case, operation 130 may be implemented as operation 1321 and operation 1322. Details are as follows:

Operation 1321: Determine kinetic energy and potential energy in the three-dimensional space based on the posture information and the physical information, where the kinetic energy and the potential energy is configured for constructing a Euler-Lagrange equation based on the three-dimensional space.

Operation 1322: Determine the third mapping relationship based on the Euler-Lagrange equation.

For example, the third mapping relationship is configured for describing a mapping relationship between third posture information in the three-dimensional space and third control information, the three-dimensional space is constructed by a first direction, a second direction, and a perpendicular direction, the three-dimensional space includes a first plane and a second plane, the first plane is configured for indicating the two-dimensional plane constructed by the first direction and the perpendicular direction, the second plane is configured for indicating another two-dimensional plane constructed by the second direction and the perpendicular direction, the first direction is a direction of a straight line perpendicular to a connection line between two ends of the robotic arm when the robotic arm extends, the second direction is a direction of the connection line between the two ends of the robotic arm when the robotic arm extends, any two of the first direction, the second direction, and the perpendicular direction are perpendicular, and the perpendicular direction is perpendicular to the connection line between the two ends of the robotic arm when the robotic arm extends.

Similar to the 2D model, in the 3D model, the third mapping relationship is mainly determined based on the Euler-Lagrange equation. For example, a partial derivative is solved for each degree of freedom in the kinetic energy and the potential energy, to obtain different partial derivatives. A plurality of dynamical equations may be then determined based on the Euler-Lagrange equation, and each dynamical equation is constructed based on a degree of freedom. Finally, the third mapping relationship is determined based on at least one dynamical equation.

Referring to the foregoing content, in some embodiments, operation 1322 may be implemented as follows: obtaining, based on the Euler-Lagrange equation, a dynamic first equation constructed based on a first degree of freedom, a dynamic second equation constructed based on a second degree of freedom, a dynamic third equation constructed based on a third degree of freedom, and a dynamic fourth equation constructed based on a fourth degree of freedom; and determining the third mapping relationship based on the dynamic first equation, the dynamic second equation, the dynamic third equation, and the dynamic fourth equation. The first degree of freedom is a degree of freedom corresponding to the first rotation angle of the robotic arm in the first plane, the dynamic first equation is configured for describing a drive constraint on the robotic arm in the first plane, the second degree of freedom is a degree of freedom corresponding to the second rotation angle of the movable object in the first plane, the dynamic second equation is configured for describing a drive constraint on the movable object in the first plane, the third degree of freedom is a degree of freedom corresponding to a linear distance in the first direction between a center of the movable object and a center of a joint that controls the robotic arm to rotate, the dynamic third equation is configured for describing a drive constraint on the movable object in the second plane, the fourth degree of freedom is a degree of freedom corresponding to an included angle between the robotic arm and a horizontal plane, and the dynamic fourth equation is configured for describing a drive constraint on the robotic arm in the second plane.

Referring to FIG. 6, it is considered that the robotic arm is located in the world coordinate system, and the world coordinate system is constructed based on that the robotic arm is in the initial state. The direction of the extension line of the robotic arm is a positive direction of the y-axis; in the initial state, a direction perpendicular to the y-axis and parallel to the ground is the direction of the x-axis; when standing in the same direction with the robotic arm, a direction of the right hand is a positive direction of the x-axis; a direction opposite to the gravity is vertical upward, a direction perpendicular to the ground is the z axis; and a space rectangular coordinate system, namely, the world coordinate system, is constructed based on this.

The three-dimensional space can be constructed based on the x, y, and z directions in the world coordinate system. The three-dimensional space includes the first plane (namely, the XOZ plane) and the second plane (namely, the YOZ plane).

Referring to the foregoing content, there are two coordinate systems in the three-dimensional space. One is the coordinate system (namely, the robotic arm coordinate system) shown in FIG. 6, and the other is the world coordinate system constructed based that the robotic arm is in the initial posture. The positions of the coordinate axes in the world coordinate system are fixed, and the positions of the coordinate axes in the robotic arm coordinate system change with the movement of the robotic arm.

Figure 12:
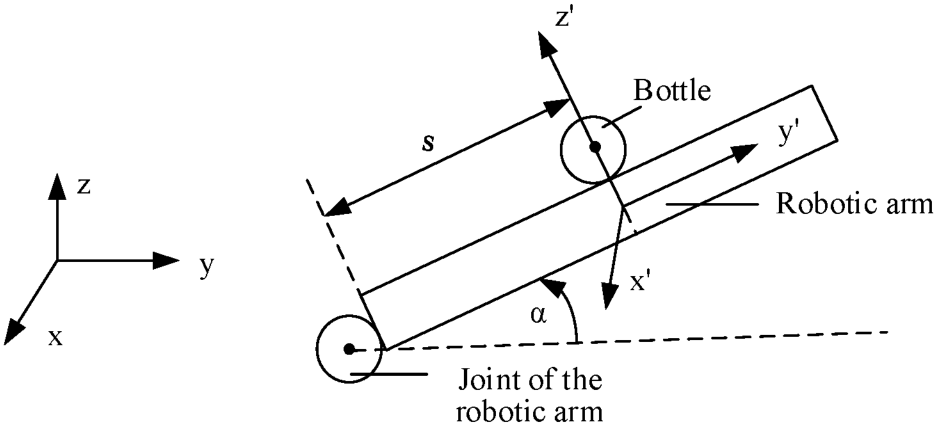
FIG. 12 is a schematic diagram of a three-dimensional space of a robotic arm according to an exemplary embodiment of present disclosure.
Figure 13:
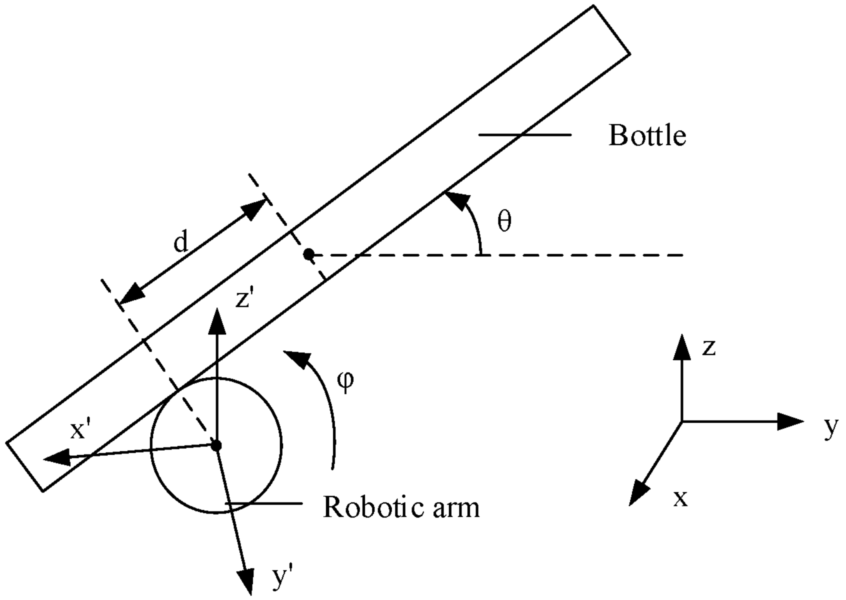
FIG. 13 is a schematic diagram of a three-dimensional space of a robotic arm according to an exemplary embodiment of present disclosure.

An example in which the first plane is the XOZ plane, the movable object is a bottle, and the bottle is placed on the lower arm of the robotic arm is used, the XOZ plane in the three-dimensional space may be simplified as FIG. 12, and the YOZ plane may be simplified as FIG. 13. x, y, and z represent the world coordinate system, and x', y', and z' represent the robotic arm coordinate system.

Based on the foregoing content, because the robotic arm can move around the first rotation axis and the second rotation axis, in the 3D model, the three-dimensional space needs to be divided into two planes to determine the mapping relationship. For example, the third mapping relationship includes the first sub-mapping relationship and the second sub-mapping relationship, and the third control information includes the first control moment and the second control moment. The first sub-mapping relationship is configured for determining the first control moment, and the second sub-mapping relationship is configured for determining the second control moment.

Referring to FIG. 12, a circle at the lower left corner is configured for representing a joint rotating around the lower arm of the robotic arm, a rectangle connected thereto is a cross section of the robotic arm, and a circle located on the rectangle is a cross section of the bottle. To simplify model description of the bottle, changes of a shape and a cross-sectional area of a head and a bottom of the bottle are ignored, the bottle is considered as a homogeneous rigid body, and a position of the bottle is evaluated by using a center of mass of the bottle. In addition, the bottle and the lower arm of the robotic arm are approximately perpendicularly disposed. Therefore, the cross section of the bottle is a rectangle.

The coordinate system of the robotic arm is constructed as follows. In an extension direction of the lower arm, a direction pointing from the elbow joint to the wrist joint is a y' direction, a direction perpendicular to the $\gamma'$ direction obliquely upward is a z' direction, and a direction perpendicular to a y'Oz' plane to the right is an x' direction. Based on this, a cross-sectional radius of the bottle may be determined as $r_b$, mass of the bottle is $m_b$, a length of the bottle is $l_b$, rotational inertia of a rigid body of the lower arm in the x' direction and the y' direction is $I_{ax}$ and $I_{ay}$, and rotational inertia of the bottle on the x' axis and the $\gamma'$ axis is respectively represented as $I_{bx}$ and $I_{by}$. In addition, an included angle between an XOZ cross section and the world coordinate system in the horizontal direction is $\alpha$, and a distance in the y' direction of the lower arm between the center of the bottle and the center of the joint that controls the lower arm to rotate is represented as s.

Referring to FIG. 13, a lower circle represents a cross section of the lower arm of the robotic arm, and a rectangle represents a cross section of the bottle.

Based on this, the following may be obtained: A horizontal distance in a direction of the bottle between a contact point between the lower arm and the bottle and a center of mass of the bottle is d, an angle by which the bottle rotates relative to the world coordinate system is $\theta$, and an angle by which the lower arm rotates relative to the world coordinate system is $\varphi$. In addition, on a YOZ cross section of the lower arm, a radius of the circle is $r_a$, a length of the rigid body configured to balance the bottle is $l_a$ mass of the lower arm is $m_a$, rotational inertia of the rigid body of the lower arm in the x' direction and y' direction is $I_{ax}$ and $I_{ay}$, and rotational inertia of the bottle in the x' direction and y' direction is $I_{bx}$ and $I_{by}$. Referring to FIG. 12 and FIG. 13, it is defined that $r=r_a+r_b$, where r is a sum of a radius $r_b$ of the cross section of the bottle and a radius $r_a$ of the circle on the YOZ cross section of the lower arm. A rotation matrix is as follows:

$$R=\begin{bmatrix}1 & 0 & 0\\ 0 & \cos\alpha & -\sin\alpha\\ 0 & \sin\alpha & \cos\alpha\end{bmatrix}$$

In the XOZ plane, the center of mass of the bottle may be represented as:

$$C' = \begin{bmatrix} r\sin\varphi - d\cos\theta \\ 0 \\ r\cos\varphi + d\sin\theta \end{bmatrix}$$

The center of mass of the bottle is converted into the world coordinate system by using the rotation matrix R, which may be represented as:

$$C = \begin{bmatrix} 0 \\ s\cos\alpha \\ s\sin\alpha \end{bmatrix} + \begin{bmatrix} r\sin\varphi - d\cos\theta \\ -r\cos\varphi\sin\alpha - d\sin\theta\sin\alpha \\ r\cos\varphi\cos\alpha + d\sin\theta\cos\alpha \end{bmatrix}$$

s is configured for indicating the linear distance in the first direction between the center of the movable object and the center of the joint that controls the robotic arm to rotate. Based on the foregoing formula, time is derived, and it is assumed that θ and φ are minimum, sin θ=0, sin φ=0, cos θ=0, and cos φ=0. It may be considered that a posture angle of the bottle is close to 0, which may be understood as that the bottle is not away from a direction parallel to the ground, and the rotation angle of the lower arm is small. Therefore, the position of the center of mass of the bottle in the world coordinate system may be obtained, and may be represented as:

$$\dot{C} = \begin{bmatrix} r\dot{\varphi} - \dot{d} \\ \cos\alpha\dot{s} - s\sin\alpha\dot{\alpha} - r\cos\alpha\dot{\alpha} - d\sin\alpha\dot{\theta} \\ \sin\alpha\dot{s} + s\cos\alpha\dot{\alpha} - r\sin\alpha\dot{\alpha} + d\cos\alpha\dot{\theta} \end{bmatrix}$$

For example, a square of a linear speed of the bottle may be determined based on a dynamic system. Details are as follows:

$$v^2 = r^2\dot{\varphi}^2 + \dot{d}^2 - 2r\dot{\varphi}\dot{d} + \dot{s}^2 + s^2\dot{\alpha}^2 + r^2\dot{\alpha}^2 + d^2\dot{\theta}^2 - 2r\dot{\alpha}\dot{\alpha} + 2sd\dot{\alpha}\dot{\theta}$$

Based on the Euler-Lagrange equation, kinetic energy and potential energy of all rigid bodies in a dynamic system in the three-dimensional space need to be respectively solved. After the posture information and the physical information are determined, the kinetic energy and the potential energy in the three-dimensional space need to be determined.

For example, a sum of the kinetic energy of all rigid bodies in the dynamic system may be represented as follows:

$$T = \frac{1}{2}I_{ax}\dot{\alpha}^2 + \frac{1}{2}I_{ay}\dot{\varphi}^2 + \frac{1}{2}I_{bx}\frac{\dot{s}^2}{r_b^2} + \frac{1}{2}I_{by}\dot{\theta}^2 + \frac{1}{2}m_b v^2$$

$$U = (s\sin\alpha + r\cos\varphi\cos\alpha + d\sin\theta\cos\alpha)m_b g + \frac{1}{2}m_a g l_a \sin\alpha$$

T represents the kinetic energy, U represents the potential energy, $v^2$ has been described above, $I_{ax}$ and $I_{ay}$ are respectively configured for indicating rotational inertia of the robotic arm in the third direction and the fourth direction, $I_{bx}$ and $I_{by}$ are respectively configured for indicating rotational inertia of the movable object in a third direction and a fourth direction, where the third direction and the fourth direction are the x direction and the y direction in the robotic arm coordinate system constructed based on the robotic arm, and g is configured for indicating the gravitational acceleration. Based on this, the kinetic energy can be partialized respectively for each degree of freedom (namely, θ and φ) and a derivative thereof (namely, $\dot{\theta}$ and $\dot{\varphi}$) in an extended coordinate system, to obtain the following formulas:

$$\frac{\partial T}{\partial \dot{s}} == \frac{I_{bx}}{r_b^2}\dot{s} + m_b\dot{s} - m_b r\dot{\alpha}$$

$$\frac{\partial T}{\partial \dot{\alpha}} = I_{ax}\dot{\alpha} + m_b s^2\dot{\alpha} + m_b r^2\dot{\alpha} - m_b r\dot{s} + m_b s d\dot{\theta}$$

$$\frac{\partial T}{\partial \dot{\varphi}} = I_{ay}\dot{\varphi} + m_b r^2\dot{\varphi} - m_b r_a\dot{d} - m_b r\dot{d} + m_b r r_a\dot{\varphi}$$

$$\frac{\partial T}{\partial s} = m_b s\dot{\alpha}^2 + m_b d\dot{\alpha}\dot{\theta}$$

$$\frac{\partial T}{\partial \alpha} = 0$$

$$\frac{\partial T}{\partial \theta} = m_b r_a d\dot{\theta}^2 + m_b r_a s\dot{\alpha}\dot{\theta}$$

$$\frac{\partial T}{\partial \varphi} = -m_b r_a d\dot{\theta}^2 - m_b s r_a\dot{\alpha}\dot{\theta}$$

$$\frac{\partial U}{\partial s} = m_b g\sin\alpha$$

$$\frac{\partial U}{\partial \alpha} = m_b g s\cos\alpha - m_b g r\cos\varphi\sin\alpha - m_b g d\sin\theta\sin\alpha + \frac{1}{2}m_a g l_a\cos\alpha$$

$$\frac{\partial U}{\partial \theta} = m_b g r_a\sin\theta\cos\alpha + m_b g d\cos\theta\cos\alpha$$

$$\frac{\partial U}{\partial \varphi} = -m_b g r\sin\varphi\cos\alpha - m_b g r_a\sin\theta\cos\alpha.$$

Subsequently, for $$\frac{\partial T}{\partial \dot{s}}, \frac{\partial T}{\partial \dot{\alpha}}, \text{ and } \frac{\partial T}{\partial \dot{\varphi}},$$

time is respectively derived, to obtain the following formulas:

$$\frac{d}{dt}\frac{\partial T}{\partial \dot{s}} = \frac{I_{bx}}{r_b^2}\ddot{s} + m_b\ddot{s} - m_b r\ddot{\alpha}$$

$$\frac{d}{dt}\frac{\partial T}{\partial \dot{\alpha}} = I_{ax}\ddot{\alpha} + m_b s^2\ddot{\alpha} + 2m_b s\dot{s}\dot{\alpha} + m_b r^2\ddot{\alpha} - m_b r\ddot{s} + m_b\dot{s}d\dot{\theta} + m_b s\dot{d}\dot{\theta} + m_b s d\ddot{\theta}$$

$$\frac{d}{dt}\frac{\partial T}{\partial \dot{\theta}} = I_{by}\ddot{\theta} + m_b r_a\ddot{d} - m_b r r_a\ddot{\varphi} + m_b\dot{s}d\dot{\alpha} + m_b s d\dot{\alpha} + m_b s d\dot{\alpha}$$

$$\frac{d}{dt}\frac{\partial T}{\partial \dot{\varphi}} = I_{ay}\ddot{\varphi} + m_b r^2\ddot{\varphi} - m_b r_a\ddot{d} - m_b r\ddot{d} + m_b r r_a\ddot{\varphi}$$

$r_a$ is configured for indicating a cross-sectional radius of the robotic arm, $r_b$ is configured for indicating a cross-sectional radius of the movable object, $m_a$ is configured for indicating mass of the robotic arm, and $m_b$ is configured for indicating mass of the movable object. Subsequently, the dynamic first equation, the dynamic second equation, the dynamic third equation and the dynamic fourth equation may be obtained based on the Euler-Lagrange equation, which are specifically as follows.

$$\frac{I_{bx}}{r_b^2}\ddot{s} + m_b\ddot{s} - m_b r\ddot{\alpha} - m_b s\dot{\alpha}^2 - m_b d\dot{\alpha}\dot{\theta} + m_b g\sin\alpha = 0 \quad \text{(Formula 1)}$$

$$-m_b r\ddot{s} + I_{ax}\ddot{\alpha} + m_b s^2\ddot{\alpha} + m_b r^2\ddot{\alpha} + m_b sd\theta + m_b\dot{s}d\dot{\theta} + m_b s\dot{d}\dot{\theta} + 2m_b s\dot{s}\dot{\alpha} + m_b gs\cos\alpha - m_b gr\cos\varphi\sin\alpha - m_b gd\sin\theta\sin\alpha + \frac{1}{2}m_a g l_a\cos\alpha = \tau_x \quad \text{(Formula 2)}$$

$$m_b sd\ddot{\alpha} + I_{by}\ddot{\theta} + m_b r^2\ddot{\theta} - m_b r_a^2\ddot{\varphi} - m_b r_a\ddot{\varphi} + m_b\dot{s}d\alpha + m_b sd\alpha - m_b r_a d\dot{\theta}^2 - m_b r_a s\alpha\dot{\theta} + m_b g r_a\sin\theta\cos\alpha + m_b gd\cos\theta\cos\alpha = 0 \quad \text{(Formula 3)}$$

$$I_{ay}\phi + m_b r^2\ddot{\phi} + m_b r r_a\ddot{\phi} + m_b r_a^2\phi + m_b r r_\alpha\ddot{\phi} - m_b r_a^2\ddot{\theta} - m_b r_a\ddot{\theta} + m_b r_a d\dot{\theta}^2 + m_b s r_a\dot{\alpha}\theta - m_b gr\sin\varphi\cos\dot{\alpha} - m_b g r_a\sin\theta\cos\alpha = \tau_y. \quad \text{(Formula 4)}$$

The first line is configured for indicating a dynamical equation at s degree of freedom (namely, the dynamic third equation, or Formula 1). Because at the degree of freedom, actuation is lacked, actual input moment on the right side of the equation is 0. The second line is configured for indicating a dynamical equation at a degree of freedom (namely, the dynamic fourth equation, or Formula 2), and actuation at the degree of freedom is a moment $\tau_x$ of a motor. The third line is configured for indicating a dynamical equation at θ degree of freedom (namely, the dynamic second equation, or Formula 3). Because at the degree of freedom, actuation is lacked, actual input moment on the right side of the equation is 0. The fourth line is configured for indicating a dynamical equation at φ degree of freedom (namely, the dynamic first equation, or Formula 4), and actuation at the degree of freedom is a moment $\tau_y$ of a motor.

In some embodiments, Formulas 1 to 4 may be implemented as follows:

$$\begin{cases} m_{ss}\ddot{s} + m_{s\alpha}\ddot{\alpha} + c_s + g_s = 0 \\ m_{\alpha s}\ddot{s} + m_{\alpha\alpha}\ddot{\alpha} + m_{\alpha\theta}\ddot{\theta} + c_\alpha + g_\alpha = \tau_x \end{cases}$$

$$\begin{cases} m_{\theta\alpha}\ddot{\alpha} + m_{\theta\theta}\ddot{\theta} + m_{\theta\varphi}\ddot{\varphi} + c_\theta + g_\theta(\theta, \alpha) = 0 \\ m_{\varphi\theta}\ddot{\theta} + m_{\varphi\varphi}\ddot{\varphi} + c_\varphi + g_\varphi = \tau_y \end{cases}.$$

For ease of description below, the foregoing forms are marked as follows:

$$M\begin{bmatrix}\ddot{s}\\ \ddot{\alpha}\\ \ddot{\theta}\\ \ddot{\varphi}\end{bmatrix} + C + G = \begin{bmatrix}0 & 0\\ 1 & 0\\ 0 & 0\\ 0 & 1\end{bmatrix}\begin{pmatrix}\tau_x\\ \tau_y\end{pmatrix}.$$

The foregoing two brief forms exist for ease of description, and essentials thereof still refer to Formulas 1 to 4. Parameters related to the foregoing brief forms are not described in detail in present disclosure again. For details, refer to the foregoing descriptions about Formulas 1 to 4. Then, for the first line and the second line (namely, Formula 1 and Formula 2), a may be obtained based on the first line, and is substituted into the second line, and the first sub-mapping relationship $f_{31}$=(s, $\tau_x$) between $\tau_x$ and s can be obtained. For the third line and the fourth line (namely, Formula 3 and Formula 4), $\ddot{\theta}$ may be obtained based on the third line, and is substituted into the fourth line, to obtain the second sub-mapping relationship $f_{32}$=(θ, $\tau_y$) between $\tau_y$ and θ. The foregoing process may be understood as that, the second line and the fourth line are selected, and the following third mapping relationship may be obtained:

$$\begin{pmatrix}\ddot{s}\\ \ddot{\theta}\end{pmatrix} = f_s + h_s\begin{pmatrix}\tau_x\\ \tau_y\end{pmatrix}$$

$$f_s = \left[-M^{-1}C - M^{-1}G\right]_{2.4} \text{ and } h_s = \left(M^{-1}\begin{bmatrix}0 & 0\\ 1 & 0\\ 0 & 0\\ 0 & 1\end{bmatrix}\right)_{2.4}.$$

After the third mapping relationship is determined, s and θ may be determined by using a PID controller, and $\tau_x$ and $\tau_y$ may be determined based on the third mapping relationship. In this way, the robotic arm is controlled. For example, for the PID controller, there is the following control law:

$$\begin{pmatrix}\ddot{s}\\ \ddot{\theta}\end{pmatrix} = -k_p\begin{pmatrix}s\\ \theta\end{pmatrix} - k_d\begin{pmatrix}\dot{s}\\ \dot{\theta}\end{pmatrix}$$

$k_p$ and $k_d$ are respectively a proportional control parameter and a differential control parameter, and the two parameters may be adjusted based on results of a plurality of experiments. Further, it may be obtained based on feedback linearization that:

$$\begin{pmatrix}\tau_x\\ \tau_y\end{pmatrix} = h_s^{-1}\left(-f_s - k_p\begin{pmatrix}s\\ \theta\end{pmatrix} - k_d\begin{pmatrix}\dot{s}\\ \dot{\theta}\end{pmatrix}\right).$$

For example, when $$\frac{\lim}{\tau\to\infty}s(t) = 0 \text{ and } \frac{\lim}{\tau\to\infty}\theta(t) = 0,$$

and s=θ=0 and α=0, $\tau_x$ and $\tau_y$ can be determined, to control the robotic arm to move around the first rotation axis and the second rotation axis.

In conclusion, in the robotic arm control method provided in the embodiments of present disclosure, two implementations of constructing a mapping relationship are provided, and can respectively implemented based on a 2D/3D model. Different mapping relationships lead to different determined control information. A corresponding mapping relationship may be selected for control of the robotic arm based on an actual requirement, to satisfy different control requirements. This is not limited in present disclosure.

Referring to the foregoing content, the mapping relationship is configured for determining the control information, so that the movable object remains balanced on the robotic arm. Referring to FIG. 9, operation 160 may be implemented similar or same as operation 164. Details are as follows:

Operation 164: Control, according to the control information, the robotic arm to perform at least one movement behavior, to cause the movable object to be in the balanced state on the robotic arm.

The movement behavior of the robotic arm includes at least one of the following behaviors: remaining relatively stationary, moving, or rotating.

Referring to the foregoing content, the control information includes the first control moment and/or the second control moment.

The control information is a moment sequence formed by control moments of the joints of the robotic arm, and movement control of the joints of the robotic arm is implemented based on the moment sequence. Based on interaction of the control moments of the joints, the robotic arm visually presents two states: a stationary state and a moving state. That the robotic arm visually presents the stationary state may be understood as that a movement behavior of the robotic arm is remaining relatively stationary. In other words, based on control of the joints of the robotic arm, the robotic arm visually presents a representation that the robotic arm is stationary. That the robotic arm visually presents the moving state may be understood as that the movement behavior of the robotic arm is moving and/or rotating. In other words, based on control of the joints of the robotic arm, the robotic arm can visually present a representation that the robotic arm is moving. The term "moving" may refer to movement and/or rotation of the robotic arm. For example, the robotic arm swings up and down by using the shoulder joint as a center, or the robotic arm rotates left and right by using the shoulder joint as a rotation center.

In some embodiments, the control information includes the first control moment, and operation 160 may be implemented as: controlling the robotic arm to move around the first rotation axis based on the first control moment, to cause the movable object to be in the balanced state on the robotic arm, where the first rotation axis is the straight line perpendicular to the connection line between the two ends of the robotic arm when the robotic arm extends. In some other embodiments, the control information includes the second control moment, and operation 160 may be implemented as: controlling the robotic arm to move around the second rotation axis based on the second control moment, to cause the movable object to be in the balanced state on the robotic arm, where the second rotation axis is the extension line of the connection line between the two ends of the robotic arm when the robotic arm extends. For example, the balanced state includes the following two types: a statically balanced state, where the movable object in the statically balanced state is stationary on the robotic arm; and a dynamically balanced state, where the movable object in the dynamically balanced state displaces or rolls on the robotic arm. The statically balanced state may be further understood as that the movable object is stationary relative to the robotic arm, and the dynamically balanced state may be further understood as that the movable object displaces or rolls relative to the robotic arm. In some embodiments, the movable object in the dynamically balanced state displaces or rolls on the robotic arm without falling, or it may be understood as that: the movable object displaces or rolls relative to the robotic arm, and the movable object does not fall off the robotic arm.

The control information enables the robotic arm to perform at least one movement behavior, so that the movable object is always stationary on the robotic arm, or a relative position of the movable object and the robotic arm is changed but the movable object does not fall off the robotic arm.

Figure 14:
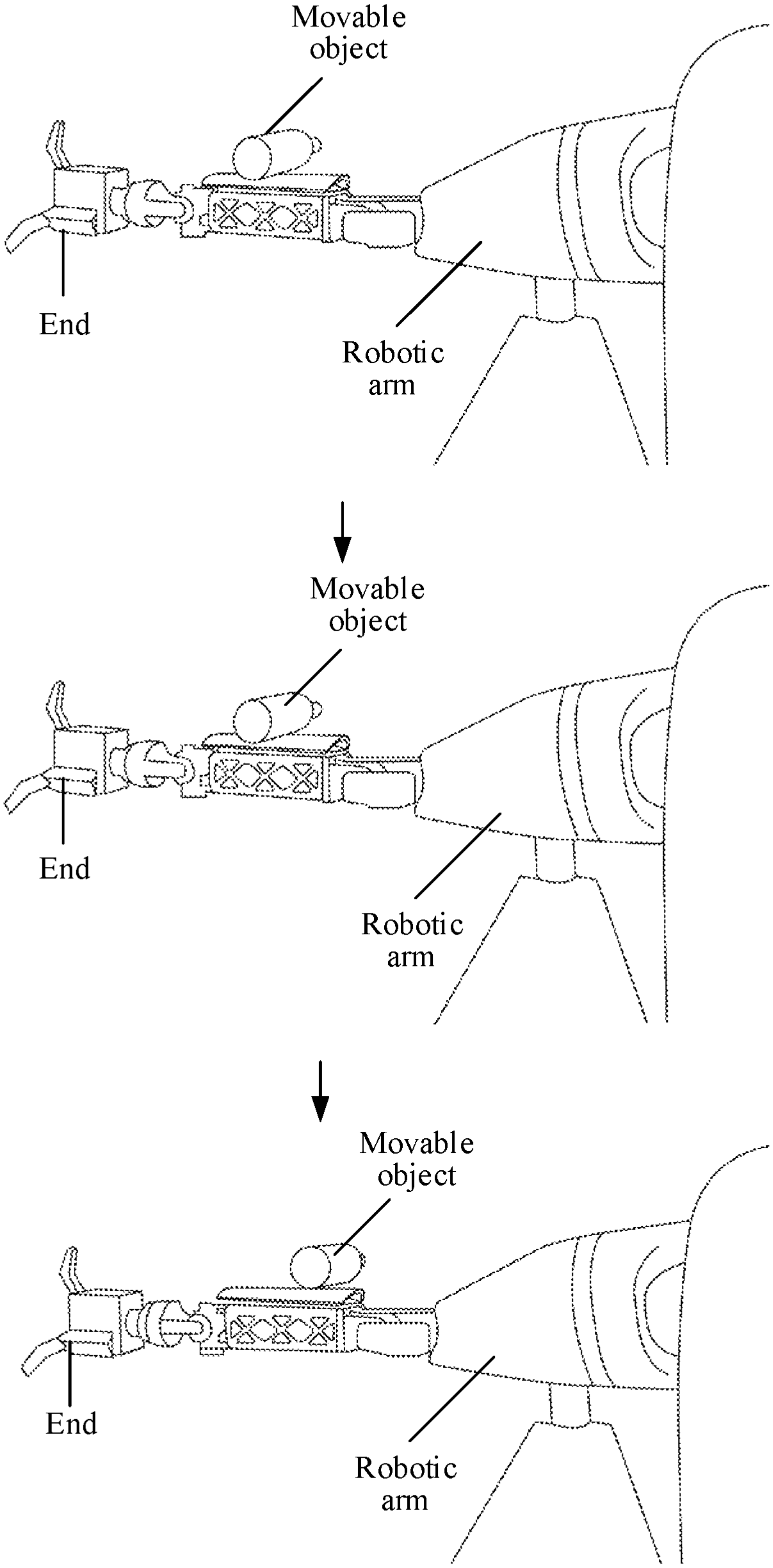
FIG. 14 is a schematic diagram of balancing of a robotic arm according to an exemplary embodiment of present disclosure.

Referring to FIG. 14, an example in which the movable object is a bottle is used, and the bottle is placed on a lower arm of the robotic arm. After determining the control information, the controller controls the joints of the robotic arm to move based on the control information. Assuming that the movable object is in the dynamically balanced state, in this case, the bottle may roll on the lower arm of the robotic arm. As shown in FIG. 14, the robotic arm performs fine adjustment in the x or y direction, so that the bottle rolls from the left side (namely, a position close to the end of the robotic arm) in the figure to the right side (namely, a position close to the shoulder joint of the robotic arm) in the figure, to avoid falling off the robotic arm.

Based on this, simulation may be performed for implementation. Refer to multi-views shown in FIG. 15 and FIG. 16. An example in which the movable object is a bottle is used. The bottle is placed on the lower arm of the robotic arm, (a) and (b) in FIG. 15 respectively show two side views of the bottle when the bottle rolls on the robotic arm, and (a) and (b) in FIG. 16 respectively show two main views of the bottle when the bottle rolls on the robotic arm.

Figure 15:
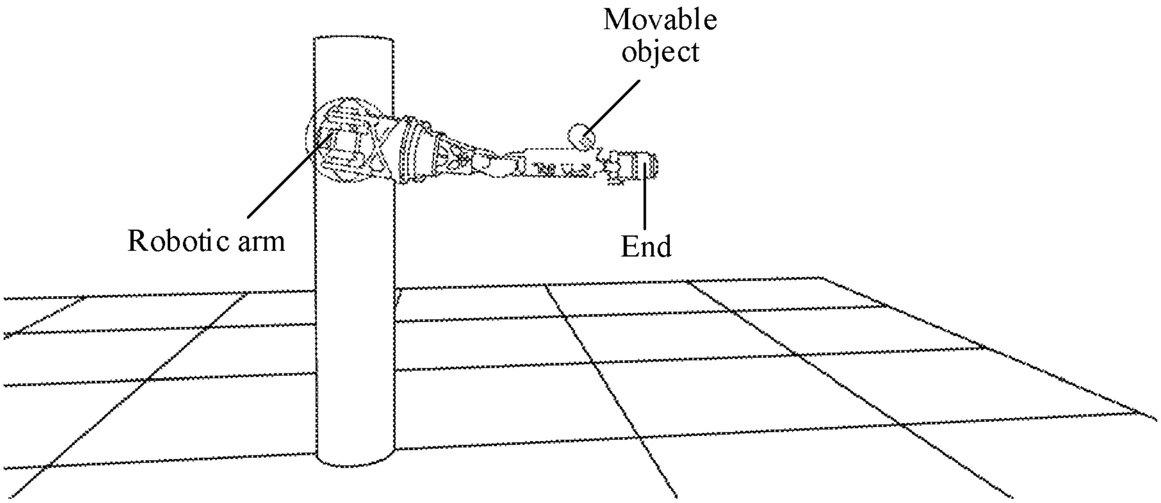
FIG. 15 is a schematic diagram of balancing of a robotic arm according to an exemplary embodiment of present disclosure.
Figure 15:
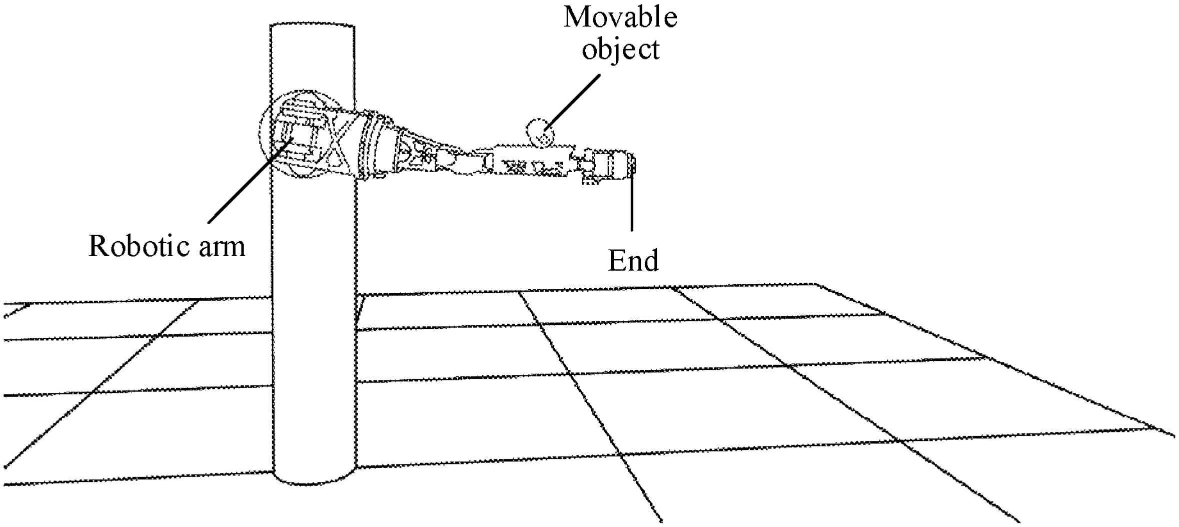
Figure 16:
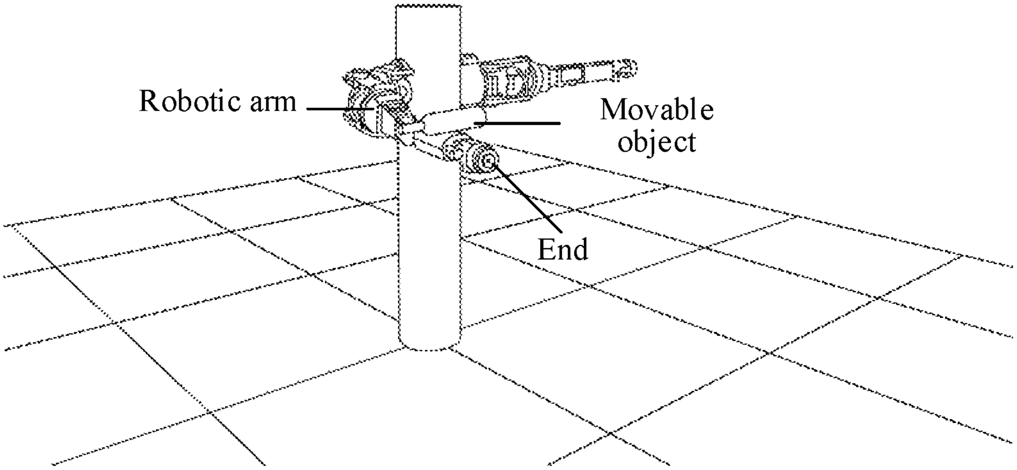
FIG. 16 is a schematic diagram of balancing of a robotic arm according to an exemplary embodiment of present disclosure.
Figure 16:
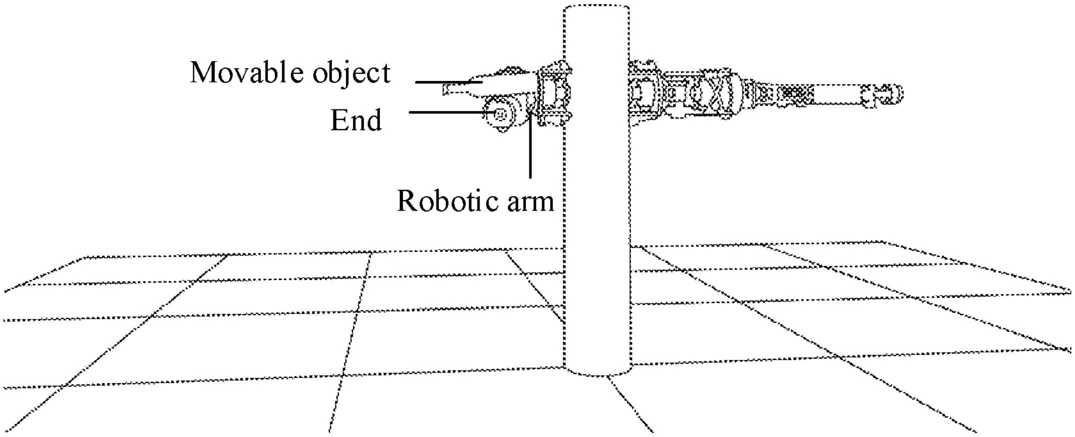

Referring to FIG. 14 to FIG. 16, the robotic arm control method provided in the embodiments of present disclosure may be applied to a robotic arm including one or more links. The movable object may be placed on the lower arm or the upper arm of the robotic arm, or may be placed on an intermediate link of the robotic arm. This is not limited in present disclosure.

In some embodiments, operation 164 may be implemented as follows: controlling, according to the control information, the robotic arm to perform at least one movement behavior, to cause the movable object to be in a statically balanced state, where the movable object in the statically balanced state is stationary on the robotic arm; and controlling, according to the control information, the robotic arm to perform at least one movement behavior, to cause the movable object to be in a dynamically balanced state, the movable object in the dynamically balanced state translating or rolling on the robotic arm without falling.

In some embodiments, after the different mapping relationships are constructed, one or more intermediate variables (namely, one or more of $\varphi$, $\alpha$, s, or $\theta$) need to be determined by using the PID controller. Based on a control principle of the PID controller, there is a reference value configured for determining the foregoing variable.

For example, when the reference value is a first value, according to the control information, the robotic arm is controlled to perform at least one movement behavior, to cause the movable object to be in the statically balanced state; and when the reference value is not the first value, according to the control information, the robotic arm is controlled to perform at least one movement behavior, to cause the movable object to be in the dynamically balanced state.

The first value may be set based on an actual requirement. For example, the first value is 0. In some embodiments, when the robotic arm is controlled to move, at least one of a control moment, a rotation angle, or an angular velocity corresponding to the robotic arm changes. Referring to FIG. 6, the robotic arm rotates in the x or y direction, to implement fine adjustment of the position of the movable object on the robotic arm. In this way, at least one of the control moment, the rotation angle, or the angular velocity of the robotic arm is changed.

In conclusion, the robotic arm control method provided in the embodiments of present disclosure provides a plurality of implementations for a movable object to be in a balanced state on a robotic arm, so that the movable object can remain balanced on the robotic arm without falling.

Figure 17:
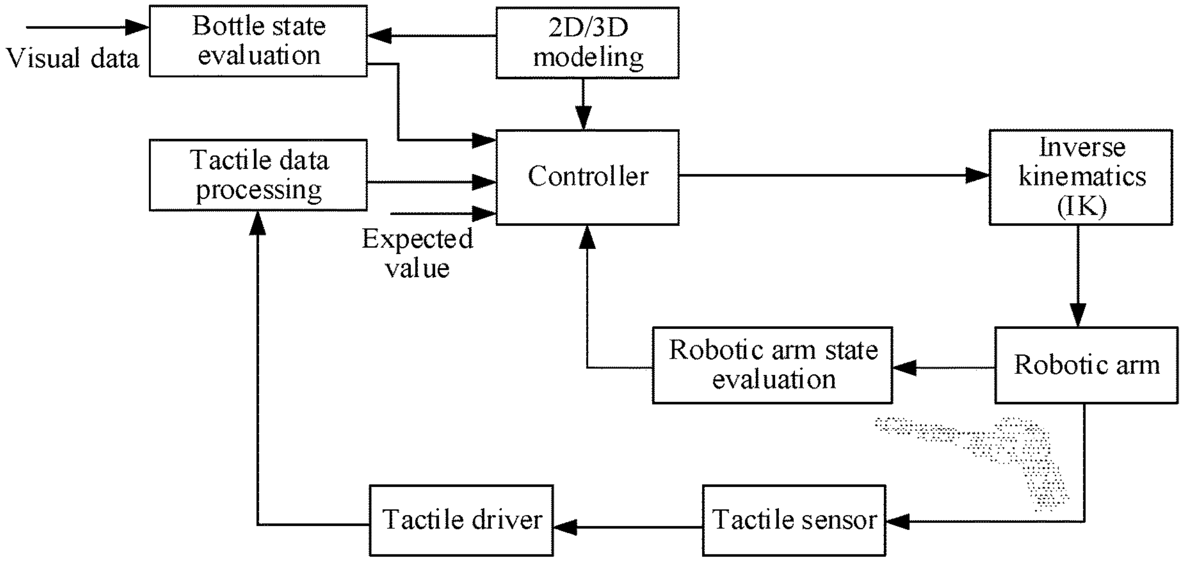
FIG. 17 is a schematic diagram of an overall control architecture of a robotic arm according to an exemplary embodiment of present disclosure.

For example, an overall control architecture of the robotic arm is shown in FIG. 17.

Referring to the foregoing content, an objective of the robotic arm control method is to control a posture and an action of the robotic arm by inputting an instruction for a joint motor of the robotic arm. For example, a joint motor encoder is mounted on each joint motor of the robotic arm, to feed back information such as an angle, an angular velocity, and electric current of rotation of the joint motor. The information may be configured for state evaluation of the robotic arm. In addition, the tactile sensor is further mounted on the finger, palm, and some links of the robotic arm. Subsequently, collected tactile signals are collected by a tactile driver for processing data such as signals.

In some embodiments, a camera may be further mounted in an external environment of the robotic arm, to obtain data of visual perception. Fusion processing may be performed on the data of the visual perception and data of tactile perception. Using an example in which the movable object is a bottle, state evaluation of the bottle (namely, bottle state evaluation) can be obtained through fusion processing performed on the perception data. For related descriptions of the fusion processing, refer to the foregoing content. Subsequently, the controller of the robotic arm may be designed based on the tactile perception information and the position and posture of the bottle obtained through bottle state evaluation. The controller may be designed based on a Euler-Lagrange model. An output of the controller may be a position and a posture of the end of the robotic arm, or may be a position and a posture of a center of mass of a link of the robotic arm.

An overall control structure of the robotic arm involved in present disclosure further includes 2D/3D modeling, to construct dynamic systems of the robotic arm and/or the movable object, to determine the mapping relationship between the posture information and the control information. In some embodiments, the 2D/3D modeling may further be configured for presetting a future state of the bottle.

For related content of determining the mapping relationship, refer to the foregoing content. Details are not described herein again.

Referring to FIG. 13, an input of the controller further includes an expected value. The expected value is the expected value used in the foregoing content of determining the intermediate parameter by using the PID controller. For related descriptions, refer to the foregoing content. Details are not described herein again.

Subsequently, a model of the robotic arm may be used to calculate a joint angle of each joint through inverse kinematics by using the position and the posture of the end or the position and the posture of the center of mass of the link. As time changes, the controller outputs a sequence of the postures of the end of the robotic arm or the postures of the center of mass of the link, and therefore, corresponds to a series of inverse kinematics solutions, to obtain a sequence of joint angles and joint angular velocities of the robotic arm. The sequence of the joint angles and the joint angular velocities is sent to the robotic arm, to control the posture of the end of the robotic arm or a position and a posture of a center of mass of a link.

The following describes an apparatus embodiment of present disclosure. For details that are not described in detail in the apparatus embodiment, refer to corresponding descriptions in the foregoing method embodiments, and details are not described herein again.

Figure 18:
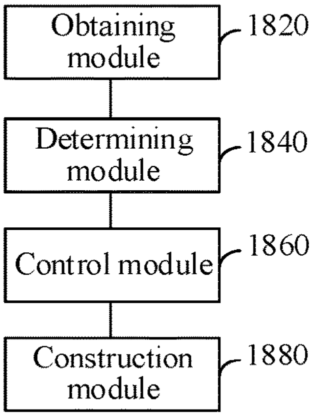
FIG. 18 is a schematic diagram of a control apparatus of a robotic arm according to an exemplary embodiment of present disclosure.

FIG. 18 is a schematic diagram of a control apparatus of a robotic arm according to an exemplary embodiment of present disclosure. The apparatus includes: an obtaining module 1820, configured to perform operation 120 in the embodiment of FIG. 4; a determining module 1840, configured to perform operation 140 in the embodiment of FIG. 4; and a control module 1860, configured to perform operation 160 in the embodiment of FIG. 4.

In some embodiments, the posture information includes first posture information and second posture information, the mapping relationship includes a first mapping relationship and a second mapping relationship, and the control information includes first control information and second control information. The determining module 1840 is configured to perform operation 141 in the embodiment of FIG. 7, where the first control information is configured for controlling the robotic arm to move around a first rotation axis; and perform operation 142 in the embodiment of FIG. 7, where the second control information is configured for controlling the robotic arm to move around the second rotation axis. The first plane is configured for indicating a two-dimensional plane constructed by a first direction and a perpendicular direction perpendicular to a connection line between two ends of the robotic arm when the robotic arm extends, the second plane is configured for indicating another two-dimensional plane constructed by a second direction and the perpendicular direction, the first direction is a direction of a straight line perpendicular to the connection line between the two ends of the robotic arm when the robotic arm extends, the second direction is a direction of the connection line between the two ends of the robotic arm when the robotic arm extends, any two of the first direction, the second direction, and the perpendicular direction are perpendicular, the first rotation axis is a straight line perpendicular to the connection line between the two ends of the robotic arm when the robotic arm extends, the first rotation axis is located at an end of the robotic arm close to a shoulder joint of the robotic arm, the second rotation axis is an extension line of the connection line between the two ends of the robotic arm when the robotic arm extends, and the second rotation axis passes through a center of the robotic arm.

In some embodiments, the first posture information includes a first rotation angle of the robotic arm in the first plane, and the first control information includes a first control moment applied in a roll direction in which the robotic arm rotates around the first rotation axis. The determining module 1840 is configured to determine the first control moment based on the first mapping relationship between the first rotation angle and the first control moment.

In some embodiments, the second posture information includes an included angle between the robotic arm and the horizontal plane, and the second control information includes a second control moment applied in a pitch direction in which the robotic arm rotates around the second rotation axis. The determining module 1840 is configured to determine the second control moment based on the second mapping relationship between the included angle and the second control moment.

In some embodiments, the posture information includes third posture information, the mapping relationship includes a third mapping relationship, and the control information includes third control information. The determining module 1840 is configured to perform operation 143 in the embodiment of FIG. 7, where the third control information is configured for controlling the robotic arm to move in a three-dimensional space. The three-dimensional space is constructed by a first direction, a second direction, and a perpendicular direction, the first direction is a direction of a straight line perpendicular to a connection line between two ends of the robotic arm when the robotic arm extends, the second direction is a direction of the connection line between the two ends of the robotic arm when the robotic arm extends, the perpendicular direction is perpendicular to the connection line between the two ends of the robotic arm when the robotic arm extends, and any two of the first direction, the second direction, and the perpendicular direction are perpendicular; and the first plane and the second plane are formed in the three-dimensional space, the first plane is configured for indicating a two-dimensional plane constructed by the first direction and the perpendicular direction, and the second plane is configured for indicating another two-dimensional plane constructed by the second direction and the perpendicular direction. In some embodiments, the third posture information includes: a linear distance in the first direction between a center of the movable object and a center of a joint that controls the robotic arm to rotate, and a second rotation angle of the movable object in the first plane. The third mapping relationship includes a first sub-mapping relationship and a second sub-mapping relationship. The third control information includes: a first control moment applied in a roll direction in which the robotic arm rotates around a first rotation axis, and a second control moment applied in a pitch direction in which the robotic arm rotates around a second rotation axis. The determining module 1840 is configured to determine the first control moment based on the first sub-mapping relationship between the linear distance and the first control moment, where the first control moment is configured for controlling the robotic arm to move around the first rotation axis; and determine the second control moment based on the second sub-mapping relationship between the second rotation angle and the second control moment, where the second control moment is configured for controlling the robotic arm to move around the second rotation axis. The first rotation axis is a straight line perpendicular to the connection line between the two ends of the robotic arm when the robotic arm extends, the first rotation axis is located at an end of the robotic arm close to a shoulder joint of the robotic arm, the second rotation axis is an extension line of the connection line between the two ends of the robotic arm when the robotic arm extends, and the second rotation axis passes through a center of the robotic arm.

In some embodiments, the apparatus further includes a construction module 1880, configured to perform operation 130 in the exemplary embodiment of FIG. 8.

In some embodiments, the mapping relationship includes a first sub-mapping relationship and a second sub-mapping relationship. The construction module 1880 is configured to perform operation 1311 and operation 1312 in the embodiment of FIG. 9. The first mapping relationship is configured for describing a mapping relationship between first posture information in the first plane and first control information, the second mapping relationship is configured for describing a mapping relationship between second posture information in the second plane and second control information, the first plane is configured for indicating a two-dimensional plane constructed by a first direction and a perpendicular direction perpendicular to a connection line between two ends of the robotic arm when the robotic arm extends, the second plane is configured for indicating another two-dimensional plane constructed by a second direction and the perpendicular direction, the first direction is a direction of a straight line perpendicular to the connection line between the two ends of the robotic arm when the robotic arm extends, the second direction is a direction of the connection line between the two ends of the robotic arm when the robotic arm extends, and any two of the first direction, the second direction, and the perpendicular direction are perpendicular.

In some embodiments, the construction module 1880 is configured to obtain, based on the Euler-Lagrange equation, a dynamic first equation constructed based on a first degree of freedom and a dynamic second equation constructed based on a second degree of freedom; and determine the first mapping relationship based on the dynamic first equation and the dynamic second equation. The first degree of freedom is a degree of freedom corresponding to the second rotation angle of the robotic arm in the first plane, the dynamic first equation is configured for describing a drive constraint on the robotic arm in the first plane, the second degree of freedom is a degree of freedom corresponding to the first rotation angle of the movable object in the first plane, and the dynamic second equation is configured for describing a drive constraint on the movable object in the first plane.

In some embodiments, the construction module 1880 is configured to obtain, based on the Euler-Lagrange equation, a dynamic third equation constructed based on a third degree of freedom and a dynamic fourth equation constructed based on a fourth degree of freedom; and determine the second mapping relationship based on the dynamic third equation and the dynamic fourth equation. The third degree of freedom is a degree of freedom corresponding to a linear distance in the first direction between a center of the movable object and a center of a joint that controls the robotic arm to rotate, the dynamic third equation is configured for describing a drive constraint on the movable object in the second plane, the fourth degree of freedom is a degree of freedom corresponding to an included angle between the robotic arm and a horizontal plane, and the dynamic fourth equation is configured for describing a drive constraint on the robotic arm in the second plane.

In some embodiments, the mapping relationship includes a third mapping relationship, and the construction module 1880 is configured to perform operation 1321 and operation 1322 in the embodiment of FIG. 9. The third mapping relationship is configured for describing a mapping relationship between the third posture information in the three-dimensional space and third control information, the three-dimensional space is constructed by a first direction, a second direction, and a perpendicular direction, the three-dimensional space includes a first plane and a second plane, the first plane is configured for indicating a two-dimensional plane constructed by the first direction and the perpendicular direction, the second plane is configured for indicating another two-dimensional plane constructed by the second direction and the perpendicular direction, the first direction is a direction of a straight line perpendicular to a connection line between two ends of the robotic arm when the robotic arm extends, the second direction is a direction of the connection line between the two ends of the robotic arm when the robotic arm extends, any two of the first direction, the second direction, and the perpendicular direction are perpendicular, and the perpendicular direction is perpendicular to the connection line between the two ends of the robotic arm when the robotic arm extends.

In some embodiments, the construction module 1880 is configured to obtain, based on the Euler-Lagrange equation, a dynamic first equation constructed based on a first degree of freedom, a dynamic second equation constructed based on a second degree of freedom, a dynamic third equation constructed based on a third degree of freedom, and a dynamic fourth equation constructed based on a fourth degree of freedom; and determine the third mapping relationship based on the dynamic first equation, the dynamic second equation, the dynamic third equation, and the dynamic fourth equation. The first degree of freedom is a degree of freedom corresponding to the first rotation angle of the robotic arm in the first plane, the dynamic first equation is configured for describing a drive constraint on the robotic arm in the first plane, the second degree of freedom is a degree of freedom corresponding to the second rotation angle of the movable object in the first plane, the dynamic second equation is configured for describing a drive constraint on the movable object in the first plane, the third degree of freedom is a degree of freedom corresponding to a linear distance in the first direction between a center of the movable object and a center of a joint that controls the robotic arm to rotate, the dynamic third equation is configured for describing a drive constraint on the movable object in the second plane, the fourth degree of freedom is a degree of freedom corresponding to an included angle between the robotic arm and a horizontal plane, and the dynamic fourth equation is configured for describing a drive constraint on the robotic arm in the second plane.

In some embodiments, the control module 1860 is configured to perform operation 164 in the embodiment of FIG. 9. The movement behavior of the robotic arm includes at least one of the following behaviors: remaining relatively stationary, moving, or rotating.

In some embodiments, the control module 1860 is configured to control, according to the control information, the robotic arm to perform at least one movement behavior, to cause the movable object to be in a statically balanced state, where the movable object in the statically balanced state is stationary on the robotic arm; and control, according to the control information, the robotic arm to perform at least one movement behavior, to cause the movable object to be in a dynamically balanced state, where the movable object in the dynamically balanced state translates or rolls on the robotic arm.

In some embodiments, the obtaining module 1820 is configured to obtain the posture information from the dynamic system based on a visual sensor; or obtain the posture information from the dynamic system based on the visual sensor and a tactile sensor.

As used herein, the term module (and other similar terms such as submodule, unit, subunit, etc.) in the present disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 19:
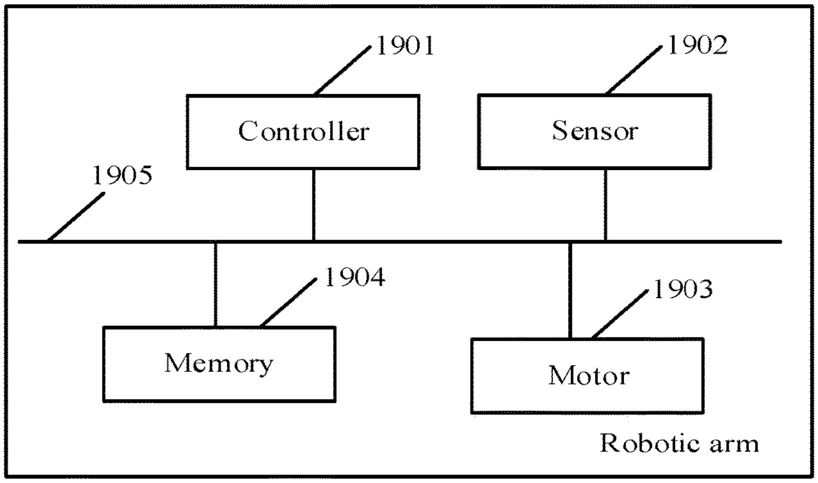
FIG. 19 is a structural block diagram of a robotic arm according to an exemplary embodiment of present disclosure.

FIG. 19 is a schematic structural block diagram of a robotic arm according to an embodiment of present disclosure. The robotic arm in this embodiment shown in FIG. 19 may include: one or more controllers 1901; and one or more sensors 1902, one or more motors 1903, and a memory 1904. The controller 1901, the sensor 1902, the motor 1903, and the memory 1904 are connected by a bus 1905. The memory 1904 is configured to store a computer program. The computer program includes program instructions. The controller 1901 is configured to execute the program instructions stored in the memory 1904. The memory 1904 may include a volatile memory such as a random access memory (RAM). The memory 1904 may alternatively include a non-volatile memory such as a flash memory or a solid-state drive (SSD). The memory 1904 may alternatively include a combination of the foregoing types of memories.

The controller 1901 may be a central controller. The controller 1901 may further include a hardware chip. The hardware chip may be an application-specific integrated circuit (ASIC), a programmable logic device (PLD), or the like. The PLD may be a field-programmable gate array (FPGA), a generic array logic (GAL), or the like. The controller 1901 may alternatively be a combination of the foregoing structures.

In this embodiment of present disclosure, the memory 1904 is configured to store a computer program, the computer program includes program instructions, and the controller 1901 is configured to execute the program instructions stored in the memory 1904, to implement operations of the foregoing robotic arm control method.

In an embodiment, the controller 1901 is configured to invoke program instructions, to perform operation 120, operation 140, and operation 160 in the embodiment of FIG. 4. In some embodiments, the posture information includes first posture information and second posture information, the mapping relationship includes a first mapping relationship and a second mapping relationship, and the control information includes first control information and second control information. The controller 1901 is configured to invoke program instructions, and is configured to perform operation 141 in the embodiment of FIG. 7, where the first control information is configured for controlling the robotic arm to move around the first rotation axis, and perform operation 142 in the embodiment of FIG. 7, where the second control information is configured for controlling the robotic arm to move around the second rotation axis. The first plane is configured for indicating a two-dimensional plane constructed by a first direction and a perpendicular direction perpendicular to a connection line between two ends of the robotic arm when the robotic arm extends, the second plane is configured for indicating another two-dimensional plane constructed by a second direction and the perpendicular direction, the first direction is a direction of a straight line perpendicular to the connection line between the two ends of the robotic arm when the robotic arm extends, the second direction is a direction of the connection line between the two ends of the robotic arm when the robotic arm extends, any two of the first direction, the second direction, and the perpendicular direction are perpendicular, the first rotation axis is a straight line perpendicular to the connection line between the two ends of the robotic arm when the robotic arm extends, the first rotation axis is located at an end of the robotic arm close to a shoulder joint of the robotic arm, the second rotation axis is an extension line of the connection line between the two ends of the robotic arm when the robotic arm extends, and the second rotation axis passes through a center of the robotic arm.

In an embodiment, the first posture information includes a first rotation angle of the robotic arm in the first plane, and the first control information includes a first control moment applied in a roll direction in which the robotic arm rotates around the first rotation axis. The controller 1901 is configured to invoke the program instructions, to perform the following operation:

- determining the first control moment based on the first mapping relationship between the first rotation angle and the first control moment.

In an embodiment, the second posture information includes an included angle between the robotic arm and the horizontal plane, and the second control information includes a second control moment applied in a pitch direction in which the robotic arm rotates around the second rotation axis. The controller 1901 is configured to invoke the program instructions, to perform the following operation:

determining the second control moment based on the second mapping relationship between the included angle and the second control moment.

In an embodiment, the posture information includes third posture information, the mapping relationship includes a third mapping relationship, and the control information includes third control information. The controller 1901 is configured to invoke the program instructions, to perform operation 143 in the embodiment of FIG. 7, where the third control information is configured for controlling the robotic arm to move in a three-dimensional space. The three-dimensional space is constructed by a first direction, a second direction, and a perpendicular direction, the first direction is a direction of a straight line perpendicular to a connection line between two ends of the robotic arm when the robotic arm extends, the second direction is a direction of the connection line between the two ends of the robotic arm when the robotic arm extends, the perpendicular direction is perpendicular to the connection line between the two ends of the robotic arm when the robotic arm extends, and any two of the first direction, the second direction, and the perpendicular direction are perpendicular; and the first plane and the second plane are formed in the three-dimensional space, the first plane is configured for indicating a two-dimensional plane constructed by the first direction and the perpendicular direction, and the second plane is configured for indicating another two-dimensional plane constructed by the second direction and the perpendicular direction.

In an embodiment, the third posture information includes: a linear distance in the first direction between a center of the movable object and a center of a joint that controls the robotic arm to rotate, and a second rotation angle of the movable object in the first plane. The third mapping relationship includes a first sub-mapping relationship and a second sub-mapping relationship. The third control information includes: a first control moment applied in a roll direction in which the robotic arm rotates around a first rotation axis, and a second control moment applied in a pitch direction in which the robotic arm rotates around a second rotation axis. The controller 1901 is configured to invoke the program instructions, to perform the following operations:

determining the first control moment based on the first sub-mapping relationship between the linear distance and the first control moment, where the first control moment is configured for controlling the robotic arm to move around the first rotation axis; and determining the second control moment based on the second sub-mapping relationship between the second rotation angle and the second control moment, where the second control moment is configured for controlling the robotic arm to move around the second rotation axis. The first rotation axis is a straight line perpendicular to the connection line between the two ends of the robotic arm when the robotic arm extends, the first rotation axis is located at an end of the robotic arm close to a shoulder joint of the robotic arm, the second rotation axis is an extension line of the connection line between the two ends of the robotic arm when the robotic arm extends, and the second rotation axis passes through a center of the robotic arm.

In an embodiment, the controller 1901 is configured to invoke program instructions, to perform operation 130 in the embodiment of FIG. 8. In an embodiment, the mapping relationship includes a first mapping relationship and a second mapping relationship. The controller 1901 is configured to invoke the program instructions, to perform operation 1311, and operation 1312 in the embodiment of FIG. 9. The first mapping relationship is configured for describing a mapping relationship between first posture information in the first plane and first control information, the second mapping relationship is configured for describing a mapping relationship between second posture information in the second plane and second control information, the first plane is configured for indicating a two-dimensional plane constructed by a first direction and a perpendicular direction perpendicular to a connection line between two ends of the robotic arm when the robotic arm extends, the second plane is configured for indicating another two-dimensional plane constructed by a second direction and the perpendicular direction, the first direction is a direction of a straight line perpendicular to the connection line between the two ends of the robotic arm when the robotic arm extends, the second direction is a direction of the connection line between the two ends of the robotic arm when the robotic arm extends, and any two of the first direction, the second direction, and the perpendicular direction are perpendicular.

In an embodiment, the controller 1901 is configured to invoke the program instructions, to perform the following operations: obtaining, based on the Euler-Lagrange equation, a dynamic first equation constructed based on a first degree of freedom and a dynamic second equation constructed based on a second degree of freedom; and determining the first mapping relationship based on the dynamic first equation and the dynamic second equation. The first degree of freedom is a degree of freedom corresponding to the second rotation angle of the robotic arm in the first plane, the dynamic first equation is configured for describing a drive constraint on the robotic arm in the first plane, the second degree of freedom is a degree of freedom corresponding to the first rotation angle of the movable object in the first plane, and the dynamic second equation is configured for describing a drive constraint on the movable object in the first plane.

In an embodiment, the controller 1901 is configured to invoke the program instructions, to perform the following operations: obtaining, based on the Euler-Lagrange equation, a dynamic third equation constructed based on a third degree of freedom and a dynamic fourth equation constructed based on a fourth degree of freedom; and determining the second mapping relationship based on the dynamic third equation and the dynamic fourth equation. The third degree of freedom is a degree of freedom corresponding to a linear distance in the first direction between a center of the movable object and a center of a joint that controls the robotic arm to rotate, the dynamic third equation is configured for describing a drive constraint on the movable object in the second plane, the fourth degree of freedom is a degree of freedom corresponding to an included angle between the robotic arm and a horizontal plane, and the dynamic fourth equation is configured for describing a drive constraint on the robotic arm in the second plane. In an embodiment, the mapping relationship includes a third mapping relationship, and the controller 1901 is configured to invoke the program instructions, to perform operation 1321 and operation 1322 in the embodiment of FIG. 9. The third mapping relationship is configured for describing a mapping relationship between third posture information in a three-dimensional space and third control information, the three-dimensional space is constructed by a first direction, a second direction, and a perpendicular direction, the three-dimensional space includes a first plane and a second plane, the first plane is configured for indicating a two-dimensional plane constructed by the first direction and the perpendicular direction, the second plane is configured for indicating another two-dimensional plane constructed by the second direction and the perpendicular direction, the first direction is a direction of a straight line perpendicular to a connection line between two ends of the robotic arm when the robotic arm extends, the second direction is a direction of the connection line between the two ends of the robotic arm when the robotic arm extends, any two of the first direction, the second direction, and the perpendicular direction are perpendicular, and the perpendicular direction is perpendicular to the connection line between the two ends of the robotic arm when the robotic arm extends.

In an embodiment, the controller 1901 is configured to invoke the program instructions, to perform the following operations:

obtaining, based on the Euler-Lagrange equation, a dynamic first equation constructed based on a first degree of freedom, a dynamic second equation constructed based on a second degree of freedom, a dynamic third equation constructed based on a third degree of freedom, and a dynamic fourth equation constructed based on a fourth degree of freedom; and determining the third mapping relationship based on the dynamic first equation, the dynamic second equation, the dynamic third equation, and the dynamic fourth equation. The first degree of freedom is a degree of freedom corresponding to the first rotation angle of the robotic arm in the first plane, the dynamic first equation is configured for describing a drive constraint on the robotic arm in the first plane, the second degree of freedom is a degree of freedom corresponding to the second rotation angle of the movable object in the first plane, the dynamic second equation is configured for describing a drive constraint on the movable object in the first plane, the third degree of freedom is a degree of freedom corresponding to a linear distance in the first direction between a center of the movable object and a center of a joint that controls the robotic arm to rotate, the dynamic third equation is configured for describing a drive constraint on the movable object in the second plane, the fourth degree of freedom is a degree of freedom corresponding to an included angle between the robotic arm and a horizontal plane, and the dynamic fourth equation is configured for describing a drive constraint on the robotic arm in the second plane.

The sensor 1902 is configured to obtain the posture information from the dynamic system based on a visual sensor; or obtain the posture information from the dynamic system based on the visual sensor and a tactile sensor. For related content of the posture information, refer to the foregoing content. Details are not described herein again. The motor 1903 is configured to control the robotic arm to move and complete an action task based on the control information. The motor 1903 includes joint motors and wheel motors of the robotic arm.

For example, an embodiment of present disclosure further provides a robot. The robot includes the foregoing robotic arm. The robotic arm may be configured to implement the robotic arm control method provided in the foregoing method embodiments. For a structure of the robotic arm, refer to the descriptions in FIG. 19, and for a robotic arm control method, refer to the foregoing method embodiments, and details are not described again.

An embodiment of present disclosure further provides a robotic arm. The robotic arm includes a controller and a memory. The memory has at least one program code stored therein, and the at least one program code is loaded and executed by the controller, to implement the robotic arm control method. An embodiment of present disclosure further provides a computer device. The computer device includes a processor and a memory. The memory has at least one segment of program. The at least one segment of program is loaded and executed by the processor, to implement the robotic arm control method.

An embodiment of present disclosure further provides a computer-readable storage medium. The computer-readable storage medium has a computer program stored therein. The computer program is configured to be executed by a processor, to implement the robotic arm control method. In some embodiments, the computer-readable storage medium may include: a read-only memory (ROM), a random access memory (RAM), a solid-state drive (SSD), an optical disc, or the like. The random access memory may include a resistance random access memory (ReRAM) and a dynamic random access memory (DRAM). The sequence numbers of the foregoing embodiments of present disclosure are merely for description purpose but do not indicate the preference of the embodiments.

As such, the disclosed robotic arm can allow and keep a movable object balanced at any position on the robotic arm other than an end without falling, such as preventing a bottle from sliding off a lower arm through a lower arm shell of the robotic arm. Based on a mapping relationship between posture information of a dynamic system constructed at least based on the robotic arm and control information of the robotic arm, the control information of the robotic arm can be determined, thereby implementing control of the robotic arm.

A person of ordinary skill in the art may understand that all or some of the steps of the foregoing embodiments may be implemented by using hardware, or may be implemented by a program instructing relevant hardware. The program may be stored in a computer-readable storage medium. The computer-readable storage medium may be a read-only memory, a magnetic disk, an optical disc, or the like. The foregoing descriptions are merely exemplary embodiments of present disclosure, but are not intended to limit present disclosure. Any modification, equivalent replacement, or improvement made within the spirit and principle of present disclosure shall fall within the protection scope of present disclosure.

An embodiment of present disclosure further provides a chip. The chip includes a programmable logic circuit or a program. The chip is configured to implement the robotic arm control method provided in the foregoing method embodiments. An embodiment of present disclosure further provides a computer program product. The computer program product includes computer instructions. The computer instructions are stored in a computer-readable storage medium. A processor of a computer device reads the computer instructions from the computer-readable storage medium, and the processor executes the computer instructions, so that the computer device performs the robotic arm control method according to any one of the foregoing embodiments.

What is claimed is:

1. A robotic arm control method, comprising:

obtaining a dynamic system constructed based on a robotic arm, and obtaining posture information associated with the robotic arm from the dynamic system;

determining control information of the robotic arm based on a mapping relationship between the posture information and the control information; and controlling movement of the robotic arm according to the control information, to cause a movable object, that is placed on the robotic arm at any position other than an end of the robotic arm, to be in a balanced state on the robotic arm.

2. The method according to claim 1, wherein the posture information comprises first posture information and second posture information, the mapping relationship comprises a first mapping relationship and a second mapping relationship, and the control information comprises first control information and second control information; the first posture information being configured for indicating a posture of a projection of the robotic arm in a first plane, and the second posture information being configured for indicating a posture of the robotic arm relative to a horizontal plane; and determining the control information of the robotic arm based on the mapping relationship comprises:

determining the first control information based on the first mapping relationship, the first mapping relationship being configured for describing a mapping relationship between the first posture information in the first plane and the first control information, and the first control information being configured for controlling the robotic arm to move around a first rotation axis; and determining the second control information based on the second mapping relationship, the second mapping relationship being configured for describing a mapping relationship between the second posture information in the second plane and the second control information, and the second control information being configured for controlling the robotic arm to move around a second rotation axis, the first plane being configured for indicating a two-dimensional plane constructed by a first direction and a perpendicular direction perpendicular to a connection line between two ends of the robotic arm when the robotic arm extends, the second plane being configured for indicating another two-dimensional plane constructed by a second direction and the perpendicular direction, the first direction being a direction of a straight line perpendicular to the connection line between the two ends of the robotic arm when the robotic arm extends, the second direction being a direction of the connection line between the two ends of the robotic arm when the robotic arm extends, any two of the first direction, the second direction, and the perpendicular direction are perpendicular, the first rotation axis being a straight line perpendicular to the connection line between the two ends of the robotic arm when the robotic arm extends, the first rotation axis being located at an end of the robotic arm close to a shoulder joint of the robotic arm, the second rotation axis being an extension line of the connection line between the two ends of the robotic arm when the robotic arm extends, and the second rotation axis passing through a center of the robotic arm.

3. The method according to claim 2, wherein the first posture information comprises a first rotation angle of the robotic arm in the first plane, the first control information comprises a first control moment applied in a roll direction in which the robotic arm rotates around the first rotation axis, and determining the first control information based on the first mapping relationship comprises:

determining the first control moment based on the first mapping relationship between the first rotation angle and the first control moment.

4. The method according to claim 2, wherein the second posture information comprises an included angle between the robotic arm and the horizontal plane, the second control information comprises a second control moment applied in a pitch direction in which the robotic arm rotates around the second rotation axis, and determining the first control information based on the first mapping relationship comprises:

determining the second control moment based on the second mapping relationship between the included angle and the second control moment.

5. The method according to claim 1, wherein the posture information comprises third posture information, the mapping relationship comprises a third mapping relationship, and the control information comprises third control information; and determining the control information of the robotic arm based on the mapping relationship between the posture information and the control information comprises:

determining the third control information based on the third mapping relationship, the third mapping relationship being configured for describing a mapping relationship between the third posture information in a three-dimensional space and the third control information, and the third control information being configured for controlling the robotic arm to move in the three-dimensional space, the three-dimensional space being constructed by a first direction, a second direction, and a perpendicular direction, the first direction being a direction of a straight line perpendicular to a connection line between two ends of the robotic arm when the robotic arm extends, the second direction being a direction of the connection line between the two ends of the robotic arm when the robotic arm extends, the perpendicular direction being perpendicular to the connection line between the two ends of the robotic arm when the robotic arm extends, and any two of the first direction, the second direction, and the perpendicular direction being perpendicular; and a first plane and a second plane being formed in the three-dimensional space, the first plane being configured for indicating a two-dimensional plane constructed by the first direction and the perpendicular direction, and the second plane being configured for indicating another two-dimensional plane constructed by the second direction and the perpendicular direction.

6. The method according to claim 5, wherein the third posture information comprises: a linear distance in the first direction between a center of the movable object and a center of a joint that controls the robotic arm to rotate, and a second rotation angle of the movable object in the first plane; the third mapping relationship comprises a first sub-mapping relationship and a second sub-mapping relationship; and the third control information comprises: a first control moment applied in a roll direction in which the robotic arm rotates around a first rotation axis, and a second control moment applied in a pitch direction in which the robotic arm rotates around a second rotation axis; and determining the third control information based on the third mapping relationship comprises:

determining the first control moment based on the first sub-mapping relationship between the linear distance and the first control moment, the first control moment being configured for controlling the robotic arm to move around the first rotation axis; and determining the second control moment based on the second sub-mapping relationship between the second rotation angle and the second control moment, the second control moment being configured for controlling the robotic arm to move around the second rotation axis, the first rotation axis being a straight line perpendicular to the connection line between the two ends of the robotic arm when the robotic arm extends, the first rotation axis being located at an end of the robotic arm close to a shoulder joint of the robotic arm, the second rotation axis being an extension line of the connection line between the two ends of the robotic arm when the robotic arm extends, and the second rotation axis passing through a center of the robotic arm.

7. The method according to claim 1, further comprising:

constructing the mapping relationship based on the posture information and physical information of the dynamic system, the mapping relationship being configured for describing a relationship between the posture information in a two-dimensional plane or in a three-dimensional space and the control information.

8. The method according to claim 7, wherein the mapping relationship comprises a first mapping relationship and a second mapping relationship, and constructing the mapping relationship based on the posture information and the physical information of the dynamic system comprises:

determining kinetic energy and potential energy in a first plane and a second plane based on the posture information and the physical information, the kinetic energy and the potential energy being configured for constructing a Euler-Lagrange equation respectively based on the first plane and the second plane; and determining the first mapping relationship and the second mapping relationship based on the Euler-Lagrange equation, the first mapping relationship being configured for describing a mapping relationship between first posture information in the first plane and first control information, the second mapping relationship being configured for describing a mapping relationship between second posture information in the second plane and second control information, the first plane being configured for indicating a two-dimensional plane constructed by a first direction and a perpendicular direction perpendicular to a connection line between two ends of the robotic arm when the robotic arm extends, the second plane being configured for indicating another two-dimensional plane constructed by a second direction and the perpendicular direction, the first direction being a direction of a straight line perpendicular to the connection line between the two ends of the robotic arm when the robotic arm extends, the second direction being a direction of the connection line between the two ends of the robotic arm when the robotic arm extends, and any two of the first direction, the second direction, and the perpendicular direction being perpendicular.

9. The method according to claim 8, wherein determining the first mapping relationship based on the Euler-Lagrange equation comprises:

obtaining, based on the Euler-Lagrange equation, a dynamic first equation constructed based on a first degree of freedom and a dynamic second equation constructed based on a second degree of freedom; and determining the first mapping relationship based on the dynamic first equation and the dynamic second equation, the first degree of freedom being a degree of freedom corresponding to the second rotation angle of the robotic arm in the first plane, the dynamic first equation being configured for describing a drive constraint on the robotic arm in the first plane, the second degree of freedom being a degree of freedom corresponding to the first rotation angle of the movable object in the first plane, and the dynamic second equation being configured for describing a drive constraint on the movable object in the first plane.

10. The method according to claim 8, wherein determining the second mapping relationship based on the Euler-Lagrange equation comprises:

obtaining, based on the Euler-Lagrange equation, a dynamic third equation constructed based on a third degree of freedom and a dynamic fourth equation constructed based on a fourth degree of freedom; and determining the second mapping relationship based on the dynamic third equation and the dynamic fourth equation, the third degree of freedom being a degree of freedom corresponding to a linear distance in the first direction between a center of the movable object and a center of a joint that controls the robotic arm to rotate, the dynamic third equation being configured for describing a drive constraint on the movable object in the second plane, the fourth degree of freedom being a degree of freedom corresponding to an included angle between the robotic arm and a horizontal plane, and the dynamic fourth equation being configured for describing a drive constraint on the robotic arm in the second plane.

11. The method according to claim 7, wherein the mapping relationship comprises a third mapping relationship, and constructing the mapping relationship based on the posture information and the physical information of the dynamic system comprises:

determining kinetic energy and potential energy in the three-dimensional space based on the posture information and the physical information, the kinetic energy and the potential energy being configured for constructing a Euler-Lagrange equation based on the three-dimensional space; and determining the third mapping relationship based on the Euler-Lagrange equation, the third mapping relationship being configured for describing a mapping relationship between third posture information in the three-dimensional space and third control information, the three-dimensional space being constructed by a first direction, a second direction, and a perpendicular direction and the three-dimensional space comprising a first plane and a second plane, the first plane being configured for indicating a two-dimensional plane constructed by the first direction and the perpendicular direction, the second plane being configured for indicating another two-dimensional plane constructed by the second direction and the perpendicular direction, the first direction being a direction of a straight line perpendicular to a connection line between two ends of the robotic arm when the robotic arm extends, the second direction being a direction of the connection line between the two ends of the robotic arm when the robotic arm extends, any two of the first direction, the second direction, and the perpendicular direction being perpendicular, and the perpendicular direction being perpendicular to the connection line between the two ends of the robotic arm when the robotic arm extends.

12. The method according to claim 11, wherein determining the third mapping relationship based on the Euler-Lagrange equation comprises:

obtaining, based on the Euler-Lagrange equation, a dynamic first equation constructed based on a first degree of freedom, a dynamic second equation constructed based on a second degree of freedom, a dynamic third equation constructed based on a third degree of freedom, and a dynamic fourth equation constructed based on a fourth degree of freedom; and determining the third mapping relationship based on the dynamic first equation, the dynamic second equation, the dynamic third equation, and the dynamic fourth equation, the first degree of freedom being a degree of freedom corresponding to the first rotation angle of the robotic arm in the first plane, the dynamic first equation being configured for describing a drive constraint on the robotic arm in the first plane, the second degree of freedom being a degree of freedom corresponding to the second rotation angle of the movable object in the first plane, the dynamic second equation being configured for describing a drive constraint on the movable object in the first plane, the third degree of freedom being a degree of freedom corresponding to a linear distance in the first direction between a center of the movable object and a center of a joint that controls the robotic arm to rotate, the dynamic third equation being configured for describing a drive constraint on the movable object in the second plane, the fourth degree of freedom being a degree of freedom corresponding to an included angle between the robotic arm and a horizontal plane, and the dynamic fourth equation being configured for describing a drive constraint on the robotic arm in the second plane.

13. The method according to claim 1, wherein controlling the movement of the robotic arm according to the control information, to cause the movable object to be in the balanced state on the robotic arm comprises:

controlling, according to the control information, the robotic arm to perform at least one movement behavior, to cause the movable object to be in the balanced state on the robotic arm, the movement behavior of the robotic arm comprising at least one of following behaviors: remaining relatively stationary, moving, or rotating.

14. The method according to claim 13, wherein controlling the robotic arm to perform the at least one movement behavior comprises:

controlling, according to the control information, the robotic arm to perform the at least one movement behavior, to cause the movable object to be in a statically balanced state, the movable object in the statically balanced state being stationary on the robotic arm; and controlling, according to the control information, the robotic arm to perform the at least one movement behavior, to cause the movable object to be in a dynamically balanced state, the movable object in the dynamically balanced state translating or rolling on the robotic arm.

15. The method according to claim 1, wherein obtaining the posture information associated with the robotic arm from the dynamic system comprises:

obtaining the posture information from the dynamic system based on a visual sensor; or obtaining the posture information from the dynamic system based on the visual sensor and a tactile sensor.

16. A controller, comprising:

one or more processors and a memory containing at least one program code that, when being executed, causes the one or more processors to perform:

obtaining a dynamic system constructed based on a robotic arm, and obtaining posture information associated with the robotic arm from the dynamic system;

determining control information of the robotic arm based on a mapping relationship between the posture information and the control information; and controlling movement of the robotic arm according to the control information, to cause a movable object, that is placed on the robotic arm at any position other than an end of the robotic arm, to be in a balanced state on the robotic arm.

17. The controller according to claim 16, wherein the posture information comprises first posture information and second posture information, the mapping relationship comprises a first mapping relationship and a second mapping relationship, and the control information comprises first control information and second control information; the first posture information being configured for indicating a posture of a projection of the robotic arm in a first plane, and the second posture information being configured for indicating a posture of the robotic arm relative to a horizontal plane; and the one or more processors are further configured to perform:

determining the first control information based on the first mapping relationship, the first mapping relationship being configured for describing a mapping relationship between the first posture information in the first plane and the first control information, and the first control information being configured for controlling the robotic arm to move around a first rotation axis; and determining the second control information based on the second mapping relationship, the second mapping relationship being configured for describing a mapping relationship between the second posture information in the second plane and the second control information, and the second control information being configured for controlling the robotic arm to move around a second rotation axis, the first plane being configured for indicating a two-dimensional plane constructed by a first direction and a perpendicular direction perpendicular to a connection line between two ends of the robotic arm when the robotic arm extends, the second plane being configured for indicating another two-dimensional plane constructed by a second direction and the perpendicular direction, the first direction being a direction of a straight line perpendicular to the connection line between the two ends of the robotic arm when the robotic arm extends, the second direction being a direction of the connection line between the two ends of the robotic arm when the robotic arm extends, any two of the first direction, the second direction, and the perpendicular direction are perpendicular, the first rotation axis being a straight line perpendicular to the connection line between the two ends of the robotic arm when the robotic arm extends, the first rotation axis being located at an end of the robotic arm close to a shoulder joint of the robotic arm, the second rotation axis being an extension line of the connection line between the two ends of the robotic arm when the robotic arm extends, and the second rotation axis passing through a center of the robotic arm.

18. The controller according to claim 17, wherein the first posture information comprises a first rotation angle of the robotic arm in the first plane, the first control information comprises a first control moment applied in a roll direction in which the robotic arm rotates around the first rotation axis, and the one or more processors are further configured to perform:

determining the first control moment based on the first mapping relationship between the first rotation angle and the first control moment.

19. The controller according to claim 17, wherein the second posture information comprises an included angle between the robotic arm and the horizontal plane, the second control information comprises a second control moment applied in a pitch direction in which the robotic arm rotates around the second rotation axis, and the one or more processors are further configured to perform:

determining the second control moment based on the second mapping relationship between the included angle and the second control moment.

20. A non-transitory computer-readable storage medium containing a computer program that, when being executed, causes at least one processor to perform:

obtaining a dynamic system constructed based on a robotic arm, and obtaining posture information associated with the robotic arm from the dynamic system;

determining control information of the robotic arm based on a mapping relationship between the posture information and the control information; and controlling movement of the robotic arm according to the control information, to cause a movable object, that is placed on the robotic arm at any position other than an end of the robotic arm, to be in a balanced state on the robotic arm.

* * * * *